US 12,448,982 B2

(12) United States Patent
Yamarthi et al.

(10) Patent No.: US 12,448,982 B2
(45) Date of Patent: Oct. 21, 2025

(54) IMPELLER BEARINGS FOR PUMPS

(71) Applicant: General Electric Company, Schenectady, NY (US)

(72) Inventors: David Raju Yamarthi, Bengaluru (IN); Brian G. Brzek, Niskayuna, NY (US); Adam Joseph Wangler, Evendale, OH (US); David Justin Brady, Lynn, MA (US); Prachi Anand Tappu, Bengaluru (IN); Santosh Pattnaik, Bengaluru (IN); Mohan Kannaiah Raju, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/676,216

(22) Filed: May 28, 2024

(65) Prior Publication Data
US 2024/0309882 A1    Sep. 19, 2024

Related U.S. Application Data

(63) Continuation of application No. 17/832,360, filed on Jun. 3, 2022, now Pat. No. 12,000,406.

(51) Int. Cl.
*F04D 29/20* (2006.01)
*F04D 13/02* (2006.01)
(Continued)

(52) U.S. Cl.
CPC ......... *F04D 29/20* (2013.01); *F04D 29/0473* (2013.01); *F04D 13/021* (2013.01);
(Continued)

(58) Field of Classification Search
CPC ........ F04D 29/20; F04D 13/021; F04D 13/06; F04D 13/0646; F04D 25/0606;
(Continued)

(56) References Cited

U.S. PATENT DOCUMENTS 2,453,524 A * 11/1948 McMahan ............... F04D 27/02
415/208.4
3,433,164 A    3/1969 Neal
(Continued)

FOREIGN PATENT DOCUMENTS

CN    205840927 U    12/2016
CN    107448246 A    12/2017
(Continued)

OTHER PUBLICATIONS

CN112855563A translation (Year: 2025).*
(Continued)

*Primary Examiner* — David N Brandt
(74) *Attorney, Agent, or Firm* — Hanley, Flight & Zimmerman, LLC

(57) ABSTRACT

Impeller bearings for pumps are disclosed. An example fluid pump includes a motor, a shaft coupled to a rotor of the motor, an impeller coupled to the shaft forward of the motor, the impeller including blades to pump a fluid, a first radial bearing positioned around the shaft aft of the motor, a second radial bearing positioned around the impeller, and guide vanes extending radially from the second radial bearing upstream of the blades of the impeller.

17 Claims, 10 Drawing Sheets

(51) Int. Cl.
*F04D 13/06* (2006.01)
*F04D 25/06* (2006.01)
*F04D 29/04* (2006.01)
*F04D 29/041* (2006.01)
*F04D 29/047* (2006.01)
*F04D 29/049* (2006.01)

(52) U.S. Cl.
CPC ...... *F04D 13/0646* (2013.01); *F04D 25/0606* (2013.01); *F04D 29/0405* (2013.01); *F04D 29/0413* (2013.01); *F04D 29/049* (2013.01)

(58) Field of Classification Search
CPC ............. F04D 29/0405; F04D 29/0413; F04D 29/047; F04D 29/049; F04D 29/0473; F04D 29/2222; F04D 29/2261; F04D 1/00; F05D 2240/61
See application file for complete search history.

(56) References Cited

U.S. PATENT DOCUMENTS

| | | |
|---|---|---|
| 5,857,348 A | 1/1999 | Conry |
| 6,439,845 B1 * | 8/2002 | Veres .................. F04D 13/0666 416/185 |
| 6,751,941 B2 | 6/2004 | Edelman et al. |
| 7,374,398 B2 | 5/2008 | Marchese et al. |
| 7,704,056 B2 | 4/2010 | Masoudipour et al. |
| 7,757,502 B2 | 7/2010 | Merritt et al. |
| 8,418,495 B2 | 4/2013 | Merritt et al. |
| 8,893,499 B2 | 11/2014 | Maier |
| 9,353,765 B2 | 5/2016 | Haley et al. |
| 10,724,545 B2 | 7/2020 | Stefanovic et al. |
| 10,774,874 B2 | 9/2020 | Binion et al. |
| 10,830,242 B2 * | 11/2020 | Ehrsam ..................... F04D 1/00 |
| 10,982,713 B2 | 4/2021 | Ertas et al. |
| 11,125,109 B2 | 9/2021 | Nayak et al. |
| 2009/0044548 A1 | 2/2009 | Masoudipour et al. |
| 2016/0208675 A1 * | 7/2016 | Prabhakaran ........... F01P 7/162 |
| 2019/0331027 A1 | 10/2019 | Fairman |
| 2021/0164473 A1 * | 6/2021 | Pawellek .............. F04D 29/106 |
| 2022/0049713 A1 * | 2/2022 | Ludwig .................. F16C 17/08 |

FOREIGN PATENT DOCUMENTS

| | | | |
|---|---|---|---|
| CN | 112855563 A * | 5/2021 | ........... F04D 13/021 |
| DK | 202070505 A1 * | 2/2022 | ......... F04D 13/0606 |
| EP | 3805529 A1 | 4/2021 | |
| GB | 914912 A | 1/1963 | |
| JP | 2008232289 A | 10/2008 | |
| JP | 2014001642 A | 1/2014 | |
| WO | 2013150958 A1 | 10/2013 | |
| WO | 2014160257 A1 | 10/2014 | |

OTHER PUBLICATIONS

United States Patent and Trademark Office, "Non-Final Office Action," issued in connection with U.S. Appl. No. 17/832,360, mailed on Jun. 9, 2023, 20 pages.
United States Patent and Trademark Office, "Final Office Action," issued in connection with U.S. Appl. No. 17/832,360, mailed on Sep. 27, 2023, 23 pages.
United States Patent and Trademark Office, "Advisory Action," issued in connection with U.S. Appl. No. 17/832,360, dated Dec. 6, 2023, 3 pages.
United States Patent and Trademark Office, "Notice of Allowance and Fee(s) Due," issued in connection with U.S. Appl. No. 17/832,360, dated Jan. 31, 2024, 7 pages.

* cited by examiner

IMPELLER BEARINGS FOR PUMPS

This patent arises from a continuation of U.S. patent application Ser. No. 17/832,360, which was filed on Jun. 3, 2022. U.S. patent application Ser. No. 17/832,360 is hereby incorporated herein by reference in its entirety. Priority to U.S. patent application Ser. No. 17/832,360 is hereby claimed.

FIELD OF THE DISCLOSURE

This disclosure relates generally to fluid pumps and, more particularly, to impeller bearings for pumps.

BACKGROUND

Aircraft typically include various accessory systems supporting the operation of the aircraft and/or its gas turbine engine(s). For example, such accessory systems may include a lubrication system that lubricates components of the engine(s), an engine cooling system that provides heating or cooling fluid to engine components, an environmental control system that provides heating or cooling fluid to the cabin of the aircraft, and/or the like. As such, heat is added or removed from a fluid (e.g., oil, air, etc.) during operation of these accessory systems.

BRIEF DESCRIPTION OF THE DRAWINGS

In general, the same reference numbers will be used throughout the drawing(s) and accompanying written description to refer to the same or like parts. The figures are not to scale.

DETAILED DESCRIPTION

Figure 1:
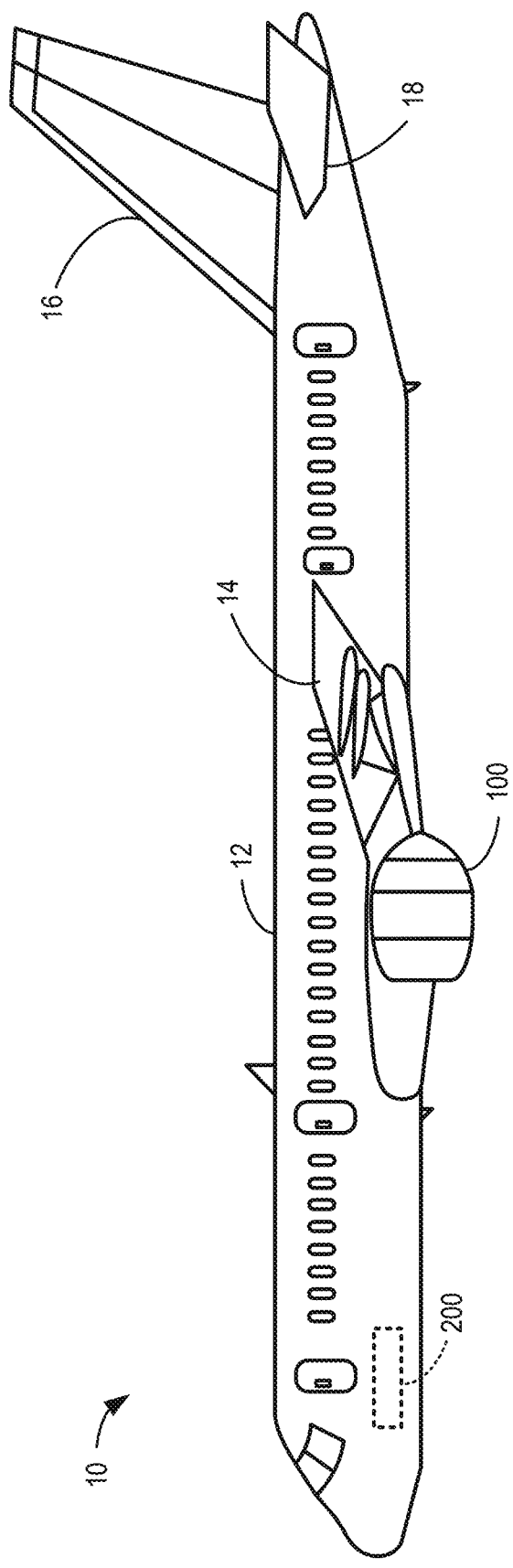
FIG. 1 is a side view of an example aircraft.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

Centrifugal fluid pumps convert rotational kinetic energy of an impeller to hydrodynamic energy of a flowing fluid to move the fluid through a system. That is, an angular velocity of the impeller causes the flowing fluid to exit the pump. Accordingly, the flow rate of the fluid is directly proportional to the angular velocity of the impeller. In turn, it can be advantageous to drive the impeller at higher angular velocities such that the fluid reaches a destination and/or passes through a system at a faster rate. For example, when the fluid pump drives a heat exchange fluid (e.g., supercritical carbon dioxide ($sCO_2$)) with an increased flow rate, the heat exchange fluid can cause thermal energy to be transferred to, or from, a working fluid (e.g., air, fuel, etc.) at a faster rate.

The impeller is driven by an electric motor that rotates a shaft (e.g., a motor shaft). For example, as a stator of the motor receives electrical energy, the stator provides electromagnetic forces to a rotor of the motor, which cause the rotor to encounter a torque. Accordingly, the shaft can be coupled to the rotor of the motor such that the torque causes the shaft to rotate. In this case, the mechanical power supplied to the pump by the electric motor would be equal to the quotient of the rotational kinetic energy and the amount of time the power is being supplied.

In some examples of fluid pump systems (e.g., centrifugal pumps), the shaft is rotatably supported in a housing via rolling element bearings that include an oil lubricant (e.g., grease, motor oil, etc.). In such fluid pump systems, to prevent the oil lubricant from contaminating the heat exchange fluid being driven by the impeller, which would otherwise affect the transfer of thermal energy and/or a safety of the system, the shaft is axially coupled to an impeller shaft via a magnetic coupling. Specifically, magnetic couplings enable torque to be transferred between two shafts (e.g., a motor shaft and an impeller shaft) without physical contact between the shafts. In some examples, the magnetic coupling can be in the form of an inner hub fastened to a first shaft (e.g., the impeller shaft) and an outer hub fastened to a second shaft (e.g., the motor shaft). In the example outer hub, there are a series of magnets (e.g., bar magnets) positioned around the example inner hub with adjacent magnets having opposite charges. In the inner hub, a similar series of magnets are positioned around an axis of rotation of the first shaft. In some examples, the outer hub and inner hub have the same number of magnets. Moreover, when the outer hub is positioned around the inner hub, magnets of opposite charges on the outer hub and the inner hub can be radially aligned such that respective magnetic fields produced by the magnets on the outer hub are attracted to respective magnetic fields produced by the magnets on the inner hub. In turn, a rotation of the outer hub can cause the inner hub to rotate. In other words, the example inner hub and the example outer hub are rotatably interlocked. This type of magnetic coupling can be referred to as a co-axial magnetic coupling.

Because there is no physical contact between the inner hub and outer hub of the co-axial magnetic coupling, a containment barrier can (e.g., a shroud) can prevent fluid from flowing between the inner hub and the outer hub. Accordingly, the barrier can and the magnetic couplings prevent the heat exchange fluid from escaping a first housing associated with the inner hub and mixing with the oil lubricants utilized in the rolling element bearings that mount the motor shaft in a second housing. Thus, the barrier can and magnetic couplings enable the fluid pump systems to operate while using oil lubricated bearings. However, requiring separate housings and multiple shafts to drive a rotation of the impeller increases a size, complexity, and cost of the pump system. Moreover, the barrier can and a separation between the inner hub and the outer hub can cause eddy current loss that reduces a strength of the magnetic connection between the hubs at higher angular velocities. In turn, the eddy current loss can limit a maximum angular velocity at which the inner hub and the outer hub remain rotationally interlocked and, in turn, a torque with which the impeller shaft can drive the impeller.

In some example centrifugal fluid pumps, to enable the impeller to be directly driven by the motor shaft, the motor shaft can be rotatably supported in a housing by foil bearings positioned around the motor shaft. Specifically, an aft foil bearing can support the motor shaft on a first side of the motor and a forward foil bearing can support the motor shaft on a second side of the motor. Given that the foil bearings do not utilize a liquid lubricant, the heat exchange fluid can flow into the housing without being adversely affected.

Although the bearings support the shaft on opposite sides of the motor, the impeller coupled to the end of the shaft remains unsupported, and, in turn, the shaft behaves like a cantilevered beam that encounters forces at the impeller end. For example, an inertia of the heat exchange fluid being driven by the impeller provides a force that acts against (e.g., resists) a rotation of the impeller. In turn, the force can cause the impeller and the shaft to encounter deflection, especially at higher rotational speeds (e.g., greater than 6,000 rotations per minute (rpm)). Further, the deflection can increase with an increased length between the closest bearing.

Accordingly, the deflection causes the impeller and the shaft to encounter stresses that negatively impact a structural strength thereof. Moreover, vibrations that result from the deflection of the impeller and/or the shaft can cause the impeller to adversely contact (e.g., bump into, rattle between, and/or rub against) inner walls of an associated housing and/or cause the shaft to adversely contact the foil bearings, which can damage the shaft, the impeller, and/or other components in the pump, such as seals. A limit must be implemented for the rotational speed of the shaft and the impeller to reduce an impact of the deflections on the lifespan of the pump. However, limiting the rotational speed also limits the output flow rate and/or pressure produced by the pump. Furthermore, the deflection of the impeller and/or the shaft can create turbulence in the flow of the heat exchange fluid, which can further limit an output flowrate and/or pressure that such centrifugal pumps can produce.

In turn, the reduced output flow rate and/or pressure limits an efficiency with which the driven fluid can transfer thermal energy. Specifically, as the pumped fluid continues to transfer energy with a working fluid, a temperature of the pumped fluid moves closer to that of the working fluid, which reduces a rate at which the thermal energy is transferred between the fluids. Accordingly, it is advantageous to introduce the heat exchange fluid to the working fluid at a faster rate such that an increased temperature difference between the fluids remains throughout the thermal energy transfer and, thus, enables the thermal energy to be transferred to or from the working fluid at a faster rate.

Example impeller bearings for pumps are disclosed herein. An example impeller bearing can be positioned around at least a portion of the impeller to mount and support an impeller in a casing. The impeller bearing can be a foil bearing (e.g., a hydrostatic gas foil bearing, a foil-air bearing, a fluid bearing, etc.), a hydrodynamic bearing, and/or a rolling element bearing that includes a solid lubricant (e.g., silver coating, graphite, molybdenum disulfide, etc.). The impeller bearing can be positioned around an inner radial portion of the impeller and/or an outer radial portion of the impeller.

In examples disclosed herein, the impeller is coupled to an end of a shaft that extends through a motor housing. For example, to couple the impeller to the shaft, a bolt can be positioned in a bore of the impeller and extend through at least a portion of the impeller. However, it should be understood that the impeller can be coupled to the shaft through other means for coupling, such as a press fit, a clamp, screws, etc., that rotatably interlock the impeller and the shaft. Additionally or alternatively, the impeller can be integral with the shaft.

In examples disclosed herein, the impeller includes a nose defined forward of expeller vanes (e.g., blades) of the impeller. In some examples, the impeller bearing is positioned around the nose of the impeller. Accordingly, a diameter of the impeller bearing can be smaller than a diameter of the shaft and, in turn, a weight of the impeller bearing can be less than a bearing utilized to radially mount the shaft. Further, stator vanes extending radially from the impeller bearing can be positioned forward of the expeller vanes to guide an input fluid flow to the expeller vanes. In some examples when the impeller bearing is a foil bearing, at least a portion of the input fluid can flow between the impeller bearing and the nose of the impeller. Specifically, when the impeller has a rotational speed greater than a certain rate, the fluid can cause an inner foil lining of the foil bearing to move away from the nose of the impeller such that the foil bearing does not contact the nose of the impeller. Accordingly, the foil bearing can minimize or otherwise reduce a blockage of fluid flow caused by the foil bearing. In some examples when the impeller bearing is a hydrodynamic bearing, a hydrostatic gas foil bearing, and/or a rolling element bearing with a solid lubricant, the impeller bearing remains in contact with the nose of the impeller.

In some examples, an outer radial portion of the impeller defines a shroud (e.g., a covering, an outer body) that is at least partially positioned around, and/or extends from an outer radial end of, the expeller vanes. In some examples, the shroud of the impeller defines a perimeter of a flow path of the fluid as the fluid is driven by the expeller blades. The impeller bearing can be positioned around the shroud of the impeller. In some examples when the impeller bearing is a foil bearing, a first portion of the fluid driven by the expeller vanes flows through an outlet and a second portion of the fluid driven by the expeller vanes flows back into a secondary flow path defined between the shroud of the impeller and the foil bearing. That is, when the impeller is rotating faster than a certain rate, flowing fluid can separate the shroud and the foil bearing. Moreover, a pressure at an inlet of the pump can cause the fluid to flow forward of the foil bearing and the shroud of the impeller before re-entering the flow path. In some examples, the shroud of the impeller extends forward of the nose of the impeller to provide more space for the fluid re-entering the flow path to mix with newer input fluid. Accordingly, the newer input fluid can drive the fluid that re-entered the flow path back towards the expeller vanes and through the outlet. In some examples, when the impeller bearing is a hydrodynamic bearing, and/or a rolling element bearing with a solid lubricant, the impeller bearing remains in contact with the shroud of the impeller.

As such, the impeller bearing can support the impeller and, in turn, an end of the shaft to which the impeller is coupled. In some examples, a shaft bearing positioned aft of a rotor in a motor housing supports an aft portion of the shaft while the impeller bearing supports a forward portion of the shaft. As a result, the impeller bearing and the shaft bearing can radially support the shaft and the impeller at opposite ends to stabilize rotations of the impeller and the shaft. In turn, the impeller bearing enables the motor to drive the shaft and the impeller to increased rotational speeds without causing deflection that would otherwise impact the flow rate of the fluid being driven and/or damage components of the pump. Specifically, the impeller bearing can enable the shaft to operate with a logarithmic decrement greater than 0.31 and, in turn, a stability margin greater than 0.21 when operating in the conical mode. As a result, when operating in the conical mode, the impeller bearing can increase a stability margin by over 27% compared to a cantilevered pump having a bearing to support the shaft forward of the rotor and aft of the impeller.

Further, the impeller bearing can increase a rotational speed of the impeller that causes the impeller and/or the shaft to encounter a peak deflection by approximately 300 rpm. Accordingly, the impeller bearing enables the impeller to operate with an increased maximum operating speed and, thus, an increased range of operating speeds. For example, the impeller bearing can enable the impeller to operate with a continuous speed range and a maximum operating speed over 1.16 times that of an impeller in a cantilevered pump. As such, the impeller bearing enables the pump to produce an increased output flow rate and/or pressure, which can increase a rate at which the pumped fluid exchanges thermal energy with a working fluid.

Moreover, the impeller bearing enables a size of the motor housing and, in turn, the pump to be reduced. Specifically, a forward end of the motor housing can be proximate a forward end of the motor as the impeller bearing removes a need for a second radial bearing to support the shaft in the motor housing forward of the motor. Additionally, the impeller bearing is positioned in a portion of the pump that is typically unoccupied and/or defined by the casing. As such, the impeller bearing improves a versatility of areas in which the pump can be utilized. Furthermore, the smaller size can reduce a weight and/or a cost of the pump.

For the figures disclosed herein, identical numerals indicate the same elements throughout the figures. Referring now to the drawings, FIG. 1 is a side view of one embodiment of an aircraft 10. As shown, in several examples, the aircraft 10 includes a fuselage 12 and a pair of wings 14 (one is shown) extending outward from the fuselage 12. In the illustrated example of FIG. 1, a gas turbine engine 100 is supported on each wing 14 to propel the aircraft through the air during flight. Additionally, as shown in the example of FIG. 1, the aircraft 10 includes a vertical stabilizer 16 and a pair of horizontal stabilizers 18 (one is shown). However, in alternative examples, the aircraft 10 may include any other suitable configuration, such as any other suitable number or type of engines.

Furthermore, the aircraft 10 may include a thermal management system 200 for transferring heat between fluids supporting the operation of the aircraft 10. More specifically, the aircraft 10 may include one or more accessory systems configured to support the operation of the aircraft 10. For example, in some examples, such accessory systems include a lubrication system that lubricates components of the engines 100, a cooling system that provides cooling air to components of the engines 100, an environmental control system that provides cooled air to the cabin of the aircraft 10, and/or the like. In such examples, the thermal management system 200 is configured to transfer heat to and/or from one or more fluids supporting the operation of the aircraft 10 (e.g., the oil of the lubrication system, the air of the cooling system and/or the environmental control system, and/or the like) from and/or to one or more other fluids supporting the operation of the aircraft 10 (e.g., the fuel supplied to the engines 100). However, in alternative examples, the thermal management system 200 may be configured to transfer heat between any other suitable fluids supporting the operation of the aircraft 10.

The configuration of the aircraft 10 described above and shown in FIG. 1 is provided only to place the present subject matter in an exemplary field of use. Thus, the present subject matter may be readily adaptable to any manner of aircraft and/or any other suitable heat transfer application.

Figure 2:
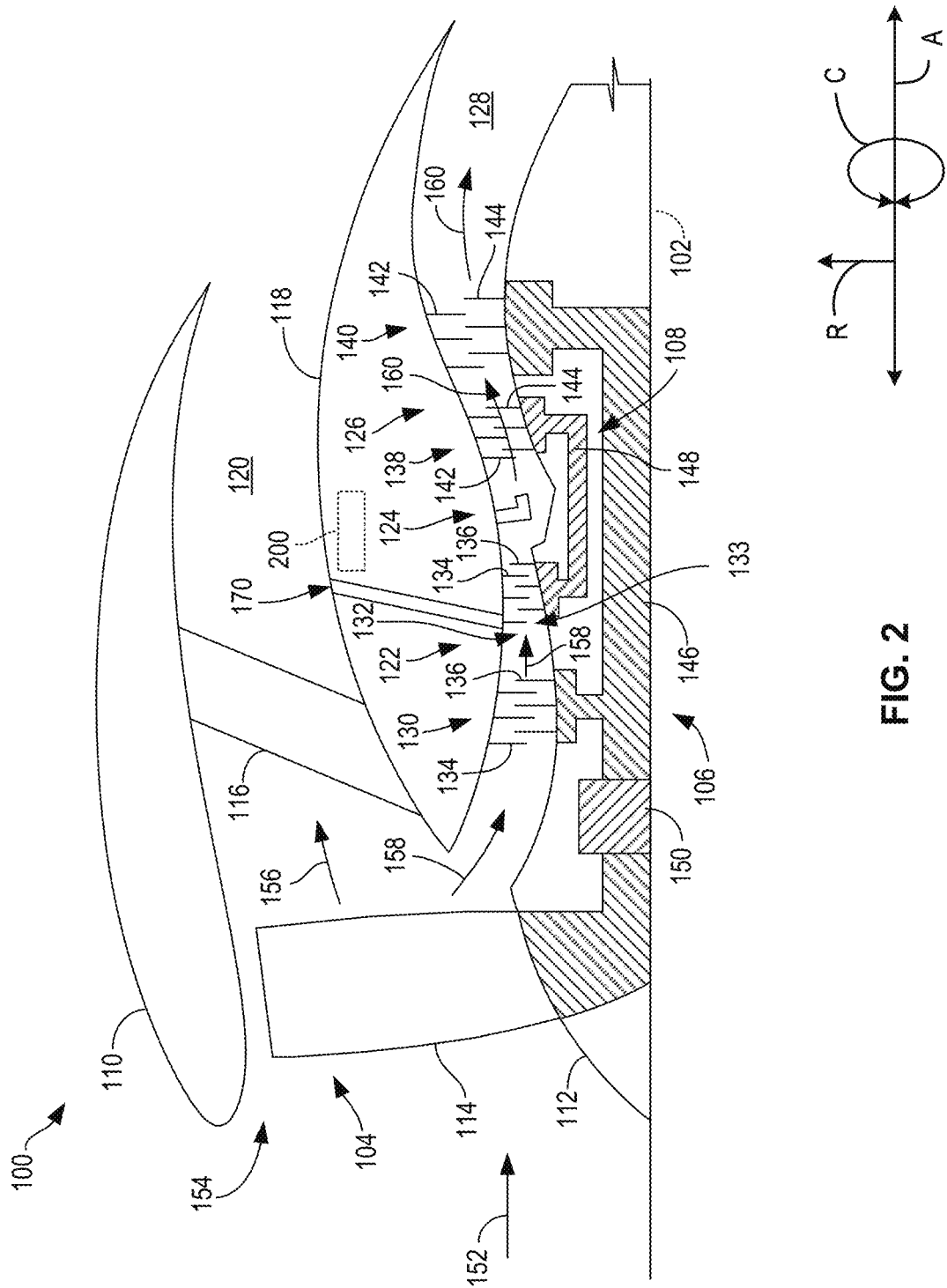
FIG. 2 is a schematic cross-sectional view of an example gas turbine engine of an aircraft.

FIG. 2 is a schematic cross-sectional view of one example implementation of the gas turbine engine 100. In the illustrated example of FIG. 2, the engine 100 is configured as a high-bypass turbofan engine. However, in alternative examples, the engine 100 may be configured as a propfan engine, a turbojet engine, a turboprop engine, a turboshaft gas turbine engine, or any other suitable type of gas turbine engine.

In general, the engine 100 extends along an axial centerline 102 and includes a fan 104, a low-pressure (LP) spool 106, and a high pressure (HP) spool 108 at least partially encased by an annular nacelle 110. More specifically, the fan 104 may include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, thereby permitting the LP spool 106 to rotate the fan blades 114. Additionally, a plurality of outlet guide vanes or struts 116 circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128. In some examples, the compressor section 122 may include a low-pressure (LP) compressor 130 of the LP spool 106 and a high-pressure (HP) compressor 132 of the HP spool 108 positioned downstream from the LP compressor 130 along the axial centerline 102. Each compressor 130, 132 may, in turn, include one or more rows of stator vanes 134 interdigitated with one or more rows of compressor rotor blades 136. As such, the compressors 130, 132 define a compressed air flow path 133 extending therethrough. Moreover, in some examples, the turbine section 126 includes a high-pressure (HP) turbine 138 of the HP spool 108 and a low-pressure (LP) turbine 140 of the LP spool 106 positioned downstream from the HP turbine 138 along the axial centerline 102. Each turbine 138, 140 may, in turn, include one or more rows of stator vanes 142 interdigitated with one or more rows of turbine rotor blades 144.

Additionally, the LP spool 106 includes the low-pressure (LP) shaft 146 and the HP spool 108 includes a high pressure (HP) shaft 148 positioned concentrically around the LP shaft 146. In such embodiments, the HP shaft 148 rotatably couples the rotor blades 144 of the HP turbine 138 and the rotor blades 136 of the HP compressor 132 such that rotation of the HP turbine rotor blades 144 rotatably drives HP compressor rotor blades 136. As shown, the LP shaft 146 is directly coupled to the rotor blades 144 of the LP turbine 140 and the rotor blades 136 of the LP compressor 130. Furthermore, the LP shaft 146 is coupled to the fan 104 via a gearbox 150. In this respect, the rotation of the LP turbine rotor blades 144 rotatably drives the LP compressor rotor blades 136 and the fan blades 114.

In some examples, the engine 100 may generate thrust to propel an aircraft. More specifically, during operation, air (indicated by arrow 152) enters an inlet portion 154 of the engine 100. The fan 104 supplies a first portion (indicated by arrow 156) of the air 152 to the bypass airflow passage 120 and a second portion (indicated by arrow 158) of the air 152 to the compressor section 122. The second portion 158 of the air 152 first flows through the LP compressor 130 in which the rotor blades 136 therein progressively compress the second portion 158 of the air 152. Next, the second portion 158 of the air 152 flows through the HP compressor 132 in which the rotor blades 136 therein continue to progressively compress the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 which the HP turbine rotor blades 144 extract a first portion of kinetic and/or thermal energy therefrom. This energy extraction rotates the HP shaft 148, thereby driving the HP compressor 132. The combustion gases 160 then flow through the LP turbine 140 in which the LP turbine rotor blades 144 extract a second portion of kinetic and/or thermal energy therefrom. This energy extraction rotates the LP shaft 146, thereby driving the LP compressor 130 and the fan 104 via the gearbox 150. The combustion gases 160 then exit the engine 100 through the exhaust section 128.

As mentioned above, the aircraft 10 may include a thermal management system 200 for transferring heat between fluids supporting the operation of the aircraft 10. In this respect, the thermal management system 200 may be positioned within the engine 100. For example, as shown in FIG. 2, the thermal management system 200 is positioned within the outer casing 118 of the engine 100. However, in alternative examples, the thermal management system 200 may be positioned at any other suitable location within the engine 100.

Furthermore, in some examples, the engine 100 defines a third-stream flow path 170. In general, the third-stream flow path 170 extends from the compressed air flow path 170 defined by the compressor section 122 to the bypass airflow passage 120. In this respect, the third-stream flow path 170 allows a portion of the compressed air 158 from the compressor section 122 to bypass the combustion section 124. More specifically, in some examples, the third-stream flow path 170 may define a concentric or non-concentric passage relative to the compressed air flow path 170 downstream of one or more of the compressors 130, 132 or the fan 104. The third-stream flow path 170 may be configured to selectively remove a portion of compressed air 158 from the compressed air flow path 170 via one or more variable guide vanes, nozzles, or other actuatable flow control structures. In addition, as will be described below, in some examples, the thermal management system 200 may transfer heat to the air flowing through the third-stream flow path 170. However, a pressure and/or a flow rate of a heat exchange fluid within the thermal management system 200 limits a rate at which thermal energy is transferred between the air and the heat exchange fluid. Additionally, it is advantageous for the thermal management system 200 to produce the pressure and/or the flow rate with components (e.g., pump systems) that minimize and/or otherwise reduce a physical size of the thermal management system 200 and/or the components (e.g., pump systems) included therein. Moreover, the thermal management system 200 must help ensure that the heat exchange fluid is free of contaminants when thermal energy is to be transferred.

The configuration of the gas turbine engine 100 described above and shown in FIG. 2 is provided only to place the present subject matter in an example field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 3:
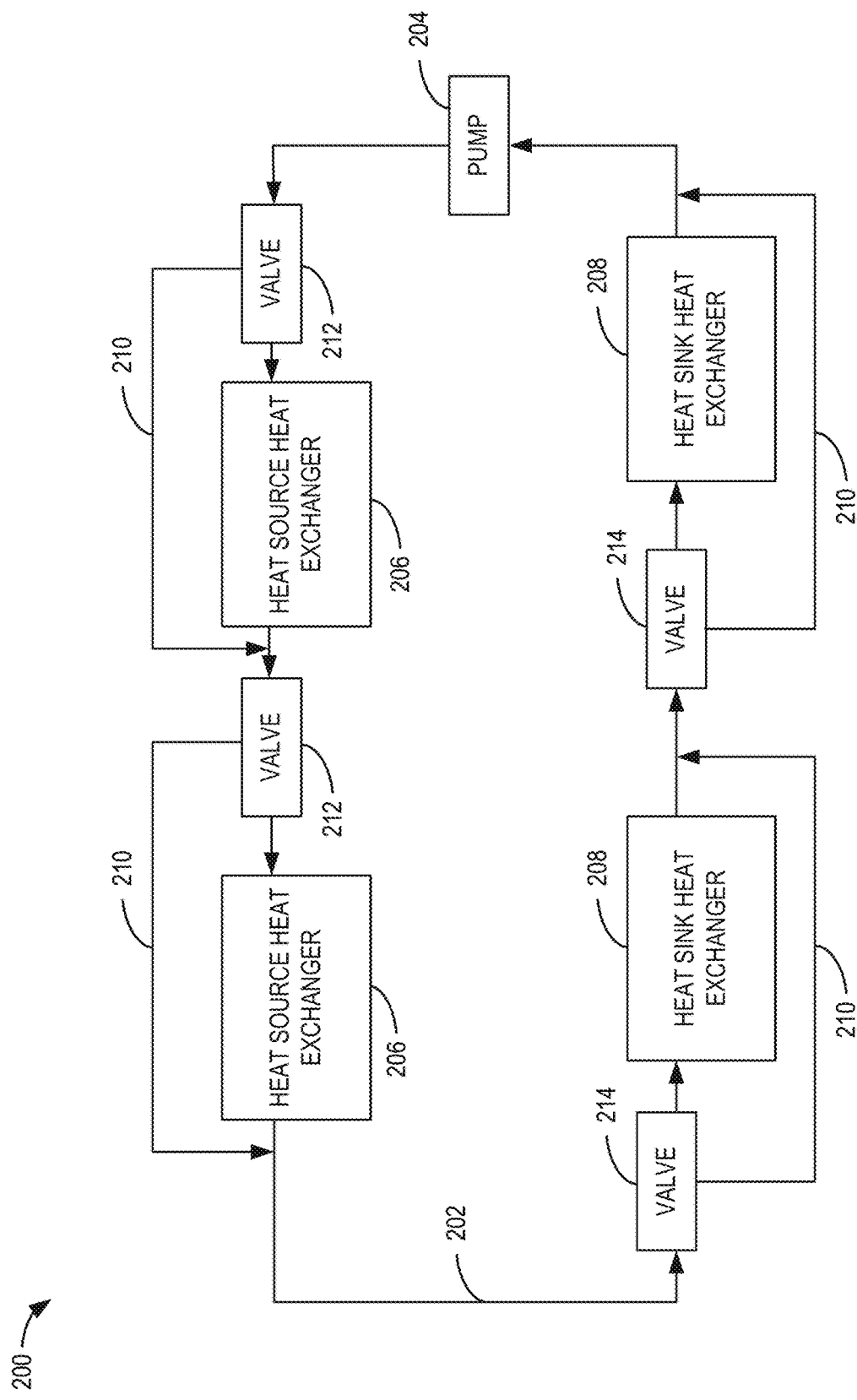
FIG. 3 is a schematic diagram of an example thermal management system for transferring heat between fluids.

FIG. 3 is a schematic view of an example implementation of the thermal management system 200 to transfer heat between fluids. In general, the thermal management system 200 will be discussed in the context of the aircraft 10 and the gas turbine engine 100 described above and shown in FIGS. 1 and 2. However, the disclosed thermal management system 200 may be implemented within any aircraft having any other suitable configuration and/or any gas turbine engine having any other suitable configuration.

As shown, the thermal management system 200 includes a thermal transport bus 202. Specifically, in several examples, the thermal transport bus 202 is configured as one or more fluid conduits through which a heat exchange fluid flows. As will be described below, the heat exchange fluid flows through various heat exchangers such that heat is added to and/or removed from the heat exchange fluid. In this respect, the heat exchange fluid may be any suitable fluid, such as super critical carbon dioxide. Moreover, in such examples, the thermal management system 200 includes a pump 204 configured to pump the heat exchange fluid through the thermal transport bus 202.

Additionally, the thermal management system 200 includes one or more heat source heat exchangers 206 arranged along the thermal transport bus 202. More specifically, the heat source heat exchanger(s) 206 is fluidly coupled to the thermal transport bus 202 such that the heat exchange fluid flows through the heat source heat exchanger(s) 206. In this respect, the heat source heat exchanger(s) 206 is configured to transfer heat from fluids supporting the operation of the aircraft 10 to the heat exchange fluid, to cool the fluids supporting the operation of the aircraft 10. Thus, the heat source heat exchanger(s) 206 adds heat to the heat exchange fluid. Although FIG. 3 illustrates two heat source heat exchangers 206, the thermal management system 200 may include a single heat source heat exchanger 206 or three or more heat source heat exchangers 206.

The heat source heat exchanger(s) 206 may correspond to any suitable heat exchanger(s) that cool a fluid supporting the operation of the aircraft 10. For example, in one example, at least one of the heat exchanger(s) 206 is a heat exchanger(s) of the lubrication system(s) of the engine(s) 100. In such an example, this heat exchanger(s) 206 transfers heat from the oil lubricating the engine(s) 100 to the heat transfer fluid. In another example, at least one of the heat exchanger(s) 206 is a heat exchanger(s) of the cooling system of the engine(s) 100. In such an example, this heat exchanger(s) 206 transfers heat from the cooling air bled from the compressor section(s) 122 (or a compressor discharge plenum) of the engine(s) 100 to the heat transfer fluid. However, in alternative examples, the heat source heat exchanger(s) 206 may correspond to any other suitable heat exchangers that cool a fluid supporting the operation of the aircraft 10. The heat source heat exchanger(s) 206 may be implemented by a plate heat exchanger(s) (e.g., a plate fin heat exchanger(s), a pillow plate heat exchanger(s), a plate and frame heat exchanger(s), a plate and shell heat exchanger(s), a spiral plate heat exchanger(s), etc.), a rotary-type regenerative heat exchanger(s), a shell and tube heat exchanger(s) (e.g., a double pipe heat exchanger(s)), etc.), or any other type of heat exchanger. The heat source heat exchanger(s) 206 may be formed of metal, graphite, ceramic, or any other material with a high thermal conductivity and melting point.

Furthermore, the thermal management system 200 includes one or more heat sink heat exchanger(s) 208 arranged along the thermal transport bus 202. More specifically, the heat sink heat exchanger(s) 208 are fluidly coupled to the thermal transport bus 202 such that the heat exchange fluid flows through the heat sink heat exchanger(s) 208. In this respect, the heat sink heat exchanger(s) 208 are configured to transfer heat from the heat exchange fluid to other fluids supporting the operation of the aircraft 10 to heat the other fluids supporting the operation of the aircraft 10. Thus, the heat sink heat exchanger(s) 208 remove heat from the heat exchange fluid. Although the example of FIG. 3 illustrates two heat sink heat exchangers 208, the thermal management system 200 may include three or more heat sink heat exchangers 208.

The heat sink heat exchanger(s) 208 may correspond to any suitable heat exchangers that heat a fluid supporting the operation of the aircraft 10. For example, at least of one of the heat exchanger(s) 208 is a heat exchanger(s) of the fuel system(s) of the engine(s) 100. In such an example, the fuel system heat exchanger(s) 208 transfers heat from the heat transfer fluid to the fuel supplied to the engine(s) 100. In another embodiment, at least one of the heat exchanger(s) 208 is a heat exchanger(s) in contact with the air 156 flowing through the bypass airflow passage(s) 120 of the engine(s) 100. In such an example, this heat exchanger(s) 208 transfers heat from the heat exchange fluid to the air 156 flowing through the bypass airflow passage(s) 120. The heat sink heat exchanger(s) 208 may be implemented by a plate heat exchanger(s) (e.g., a plate fin heat exchanger(s), a pillow plate heat exchanger(s), a plate and frame heat exchanger(s), a plate and shell heat exchanger(s), a spiral plate heat exchanger(s), etc.), a rotary-type regenerative heat exchanger(s), a shell and tube heat exchanger(s) (e.g., a double pipe heat exchanger(s)), etc.), or any other type of heat exchanger. Further, the heat sink heat exchanger(s) 208 may be formed of metal, graphite, ceramic, or any other material with a high thermal conductivity and melting point.

In several examples, one or more of the heat exchanger(s) 208 are configured to transfer heat to the air flowing through the third-stream flow path 170. In such examples, the heat exchanger(s) 208 is in contact with the air flow through the third-stream flow path 170. Thus, heat from the heat exchange fluid flowing through the thermal transport bus 202 may be transferred to the air flow through the third-stream flow path 170. The use of the third-stream flow path 170 as a heat sink for the thermal management system 200 provides one or more technical advantages. For example, the third-stream flow path 170 provides greater cooling than other sources of bleed air because a larger volume of air flows through the third-stream flow path 170 than other bleed air flow paths. Moreover, the air flowing through third-stream flow path 170 is cooler than the air flowing through other bleed air flow paths and the compressor bleed air. Additionally, the air in the third-stream flow path 170 is pressurized, thereby allowing the heat exchanger(s) 208 to be smaller than heat exchangers relying on other heat sinks within the engine. Furthermore, in examples in which the engine 100 is unducted, using the third-stream flow path 170 as a heat sink does not increase drag on the engine 100 unlike the use of ambient air (e.g., a heat exchanger in contact with air flowing around the engine 100). However, in alternative examples, the heat sink heat exchanger(s) 208 may correspond to any other suitable heat exchangers that heats a fluid supporting the operation of the aircraft 10.

Moreover, in several examples, the thermal management system 200 includes one or more bypass conduits 210. Specifically, as shown in the illustrated example of FIG. 3, each bypass conduit 210 is fluidly coupled to the thermal transport bus 202 such that the bypass conduit 210 allows at least a portion of the heat exchange fluid to bypass one of the heat exchanger(s) 206, 208. In some examples, the heat exchange fluid bypasses one or more of the heat exchanger(s) 206, 208 to adjust the temperature of the heat exchange fluid within the thermal transport bus 202. The flow of example heat exchange fluid through the bypass conduit(s) 210 is controlled to regulate the pressure of the heat exchange fluid within the thermal transport bus 202. In the illustrated example of FIG. 3, each heat exchanger 206, 208 has a corresponding bypass conduit 210. However, in alternative examples, any number of the heat exchanger(s) 206, 208 may have a corresponding bypass conduit 210 so long as there is at least one bypass conduit 210.

Additionally, in several examples, the thermal management system 200 includes one or more heat source valves 212 and one or more heat sink valves 214. In general, each heat source valve 212 is configured to control the flow of the heat exchange fluid through a bypass conduit 210 that bypasses at least one of the heat source heat exchanger(s) 206. Similarly, each heat sink valve 214 is configured to control the flow of the heat exchange fluid through a bypass conduit 210 that bypasses a heat sink heat exchanger 208. In this respect, each valve 212, 214 is fluidly coupled to the thermal transport bus 202 and a corresponding bypass conduit 210. As such, each valve 212, 214 may be moved between fully and/or partially opened and/or closed positions to selectively occlude the flow of heat exchange through its corresponding bypass conduit 210.

The valves 212, 214 are controlled based on the pressure of the heat exchange fluid within the thermal transport bus 202. More specifically, as indicated above, in certain instances, the pressure of the heat exchange fluid flowing through the thermal transport bus 202 may fall outside of a desired pressure range. When the pressure of the heat exchange fluid is too high, the thermal management system 200 may incur accelerated wear. In this respect, when the pressure of the heat exchange fluid within the thermal transport bus 202 exceeds a maximum or otherwise increased pressure value, one or more heat source valves 212 open. In such instances, at least a portion of the heat exchange fluid flows through the bypass conduits 210 instead of the heat source heat exchanger(s) 206. Thus, less heat is added to the heat exchange fluid by the heat source heat exchanger(s) 206, thereby reducing the temperature and, thus, the pressure of the fluid. In several examples, the maximum pressure value is between 3800 and 4000 pounds per square inch or less. In some examples, the maximum pressure value is between 2700 and 2900 pounds per square inch, such as 2800 pounds per square inch. In other examples, the maximum pressure value is between 1300 and 1500 pounds per square inch, such as 1400 pounds per square inch. Such maximum pressure values generally prevent the thermal management system 200 from incurring accelerated wear.

In some examples, the maximum pressure value is set prior to and/or during operation based on parameters (e.g., materials utilized, pump 204 design, aircraft 10 design, gas turbine engine 100 design, heat exchange fluid, etc.) associated with the thermal management system 200. The example maximum pressure value can be adjusted relative to the pressure capacities of the thermal transport bus 202, the pump 204, the heat exchanger(s) 206, 208, the bypass conduit(s) 210, and/or the valves 212, 214. Some examples of pump 204 architecture that influence example maximum pressure capacities are described in greater detail below.

Conversely, when the pressure of the heat exchange fluid is too low, the pump 204 may experience operability problems and increased wear. As such, when the pressure of the heat exchange fluid within the thermal transport bus falls below a minimum or otherwise reduced pressure value, one or more heat sink valves 214 open. In such instances, at least a portion of the heat exchange fluid flows through the bypass conduits 210 instead of the heat sink heat exchanger(s) 208. Thus, less heat is removed from the heat exchange fluid by the heat sink heat exchanger(s) 208, thereby increasing the temperature and, thus, the pressure of the fluid. In several examples, the minimum pressure value is 1070 pounds per square inch or more. In some examples, the minimum pressure value is between 1150 and 1350 pounds per square inch, such as 1250 pounds per square inch. In other examples, the minimum pressure value is between 2400 and 2600 pounds per square inch, such as 2500 pounds per square inch. Such minimum pressure values are generally utilized when the heat exchange fluid in a supercritical state (e.g., when the heat exchange fluid is carbon dioxide).

As such, the thermal management system 200 may be configured to operate such that the pressure of the heat transport fluid is maintained with a range extending between the minimum and maximum pressure values. In some examples, the range extends from 1070 to 4000 pounds per square inch. Specifically, in one example, the range extends from 1250 to 1400 pounds per square inch. In another example, range extends from 2500 to 2800 pounds per square inch.

Accordingly, the operation of the pump 204 and the valves 212, 214 allows the disclosed thermal management system 200 to maintain the pressure of the heat exchange fluid within the thermal transport bus 202 within a specified range of values as the thermal load placed on the thermal management system 200 varies.

Furthermore, the example pump 204 drives the flow of the heat exchange fluid through the thermal management system 200. In some examples, the thermal management system 200 includes one pump 204 or multiple pumps 204 depending on the desired flow rate, delta pressure across the pump 204, and/or the kinetic energy loss of the heat exchange fluid in the thermal transport bus 202. For example, the pump 204 may increase the output pressure head to accelerate the flow of the heat exchange fluid to a first flowrate. As the heat exchange fluid passes through the thermal transport bus 202, the example kinetic energy of the heat exchange fluid dissipates due to friction, temperature variations, etc. Due to the kinetic energy losses, the heat exchange fluid decelerates to a second flow rate at some point upstream of the pump 204. If the example second flow rate is below a desired operating flow rate of the heat exchange fluid, then the pump 204 can either be of a different architecture that outputs a higher first flow rate, or one or more additional pumps 204 can be included in the thermal management system 200. Variations on example pump 204 architectures are described in greater detail below.

Figure 4:
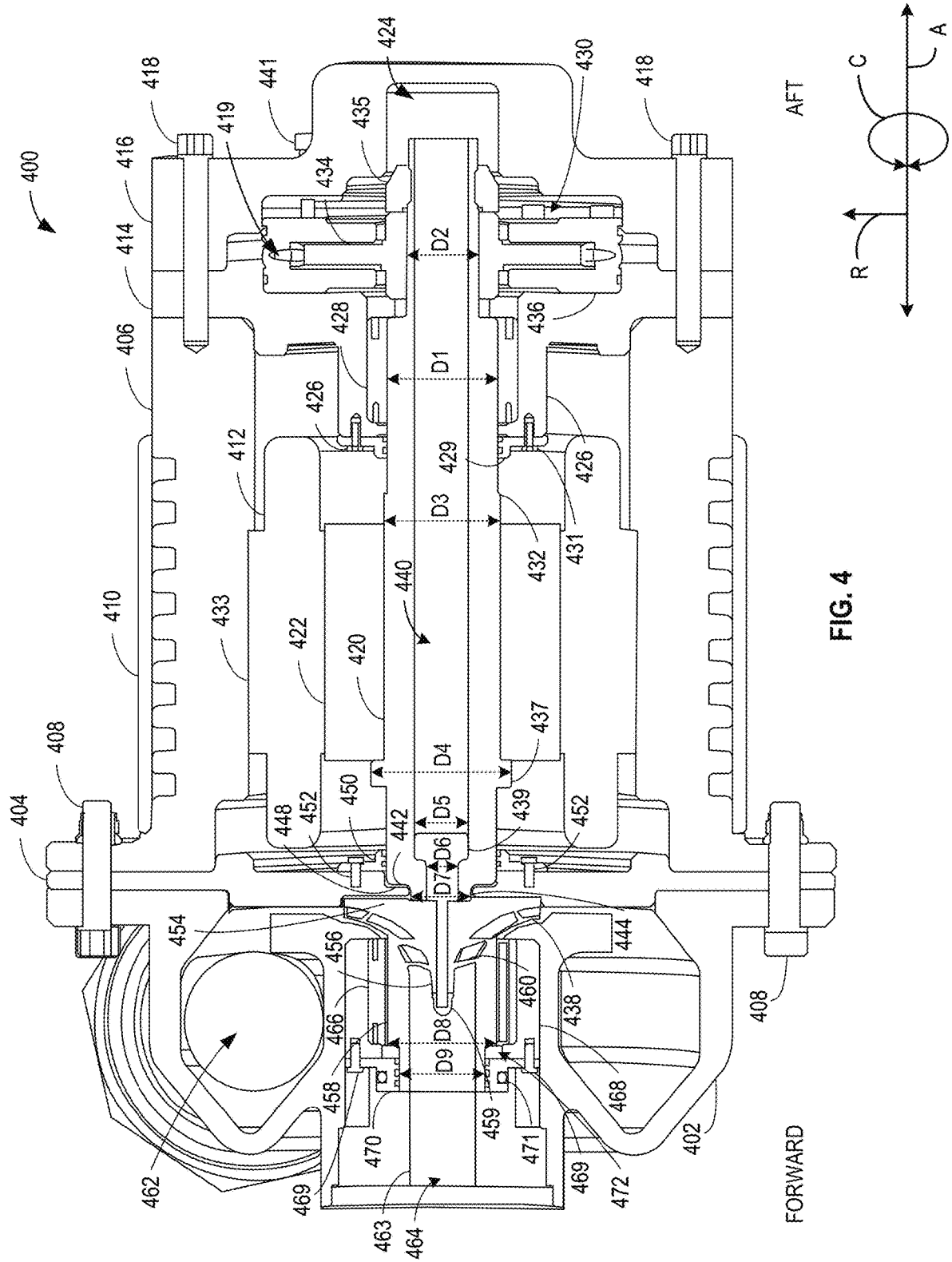
FIG. 4 illustrates an example thermal transport bus pump in accordance with the teachings disclosed herein.

FIG. 4 illustrates a first example straddle mounted fluid pump 400 in accordance with the examples disclosed herein. The first example pump 400 can be implemented in the example thermal management system 200 of FIG. 3 (e.g., the pump 204 of FIG. 3) to drive a fluid (e.g., a heat exchange fluid such as a supercritical fluid (e.g., $sCO_2$, etc.), etc.) through the thermal transport bus 202 of FIG. 3. Accordingly, the fluid can exchange thermal energy with a working fluid associated with the aircraft 10 of FIG. 1 and/or the gas turbine engine 100 of FIG. 2.

In FIG. 4, the pump 400 includes a compressor casing 402 coupled to a backplate 404 and a motor housing 406 via bolts 408. The motor housing 406 is at least partially surrounded by a cooling jacket 410 to prevent a motor 412 in the motor housing 406 from overheating during operations. An aft end of the motor housing 406 is coupled to an aft bearing housing 414 and a cover 416 via bolts 418. In some examples, the aft bearing housing 414 and/or the cover 416 is integral with the motor housing 406. Furthermore, a secondary flow inlet 419 can be defined in the aft bearing housing 414 and/or the cover 416, as discussed in further detail below.

In FIG. 4, the pump 400 includes a shaft 420 coupled to a rotor 422 of the motor 412 in the motor housing 406. Accordingly, the rotor 422 drives a rotation of the shaft 420. In FIG. 4, an aft portion of the shaft 420 (e.g., a portion of the shaft positioned aft of the rotor 422) extends through the aft bearing housing 414 and into an indentation 424 (e.g., a groove, a notch, a concavity, etc.) defined in a forward side of the cover 416. The aft bearing housing 414 includes a bearing cup 426 that extends forward into the motor housing 406.

The pump 400 includes a shaft radial bearing 428 (e.g., first radial bearing) positioned in the bearing cup 426 to radially support the aft portion of the shaft 420. For example, the shaft radial bearing 428 can be a foil bearing, a hydrodynamic bearing, and/or a rolling element bearing that includes a solid lubricant. In some examples, the shaft radial bearing 428 is coupled to the bearing cup 426 via an interference fit (e.g., a press fit), screws, or any other means for coupling that prevents at least a portion of the shaft radial bearing 428 from rotating in the bearing cup 426. As such, a portion of the fluid that flows through the secondary flow inlet 419 passes between the shaft radial bearing 428 and the shaft 420 as the fluid moves toward the forward end of the pump 400, as discussed in further detail below.

In the illustrated example of FIG. 4, a first labyrinth seal 429 is coupled to a forward end of the bearing cup 426 via screws or bolts 431. The first labyrinth seal 429 is positioned around the shaft 420 to help control a flow of the fluid in the motor housing 406. Specifically, a pressure differential on opposite sides of the first labyrinth seal 429 prevents the fluid from flowing past the first labyrinth seal 429 towards an aft end of the pump 400. Instead, the first labyrinth seal 429 enables the fluid that flows between the shaft radial bearing 428 and the shaft 420 to continue to flow towards the forward end of the pump 400.

In the illustrated example of FIG. 4, the pump 400 includes a thrust bearing 430 (e.g., an axial bearing) positioned aft of the shaft radial bearing 428. The thrust bearing 430 includes a thrust disc 434 clamped onto to the shaft 420 via a spanner nut 435. Further, the thrust bearing 430 includes a foil bearing 436 positioned around the thrust disc 434 to prevent or otherwise reduce axial movement of the shaft 420. In FIG. 4, the foil bearing 436 is coupled to the aft bearing housing 414 and the cover 416 via bolts 441. In some examples, the foil bearing 436 is fixed to the aft bearing housing 414 and/or the cover 416 via an interference fit or any other means for coupling that prevents a rotation of the foil bearing 436.

In the illustrated example of FIG. 4, the shaft radial bearing 428 is positioned around a first aft portion of the shaft 420 including a first outer diameter D1, and the thrust disc 434 is positioned around a second aft portion of the shaft 420 including a second outer diameter D2 smaller than the first outer diameter. In some examples, the first and second aft portions of the shaft 420 include the same outer diameter.

Furthermore, the aft portion of the shaft 420 can include a ridge 432 that defines a third outer diameter D3 proximate the first outer diameter D1. The ridge 432 in the aft portion of the shaft 420 can help deflect and guide the fluid that flows past the first labyrinth seal 429 toward a passageway between a stator 433 of the motor 412 and the rotor 422, as discussed in further detail below.

Additionally, a forward portion of the shaft 420 (e.g., a portion of the shaft 420 defined forward of the rotor 422) includes a flange 437 proximate a forward end of the rotor 422 to help prevent the shaft 420 from moving in an axial direction A defined by the pump 400. Accordingly, the flange 437 defines a fourth outer diameter D4 of the shaft 420.

In FIG. 4, a bolt 439 extends through a forward end of the shaft 420 to couple the shaft 420 to an impeller 438. That is, a head of the bolt 439 is positioned in a bore 440 of the shaft 420, and a stem of the bolt 439 extends at least partially through the impeller 438 to rotatably interlock the shaft 420 and the impeller 438. Specifically, the bore 440 extends through the shaft 420 in an axial direction A defined by the pump 400. Furthermore, a forward end of the bore 440 is narrowed such that an inner diameter of the shaft 420 (e.g., a diameter of the bore 440) changes from a first inner diameter D5 at, and aft of, an aft end of the bolt 439 to a second inner diameter D6 forward of the aft end of the bolt 439. Specifically, the second inner diameter D6 is smaller than a diameter of the aft end of the bolt 439 such that the second inner diameter D6 of the shaft 420 provides a stop for the head of the bolt 439. Additionally or alternatively, the impeller 438 can be coupled to the shaft 420 via a press fit, screws, or any other means for coupling that rotatably interlocks the impeller 438 and the shaft 420.

Moreover, the forward portion of the shaft 420 includes a shoulder 442 and a neck 444. Specifically, the shoulder 442 faces the forward end of the pump 400 and defines a transition from the second outer diameter of the shaft 420 forward of the flange 437 to a fifth outer diameter D7 defined by the neck 444 of the shaft 420. The fifth outer diameter D7 defines the smallest outer diameter of the shaft 420. In some examples, the fifth outer diameter is approximately equivalent to the first diameter of the bore 440. In some examples, the shaft 420 can include a uniform outer diameter.

In FIG. 4, the neck 444 extends into an opening defined in the backplate 404. Specifically, the backplate 404 includes a shoulder brace 448 that is positioned around the shoulder 442 and the neck 444 of the shaft 420. Accordingly, the shoulder brace 448 can help align the shaft 420 in the motor housing 406. Moreover, the shoulder brace 448 enables the backplate 404 to be positioned closer to a forward end of the motor 412, which can enable a size of the motor housing 406 to be reduced.

In FIG. 4, the pump 400 includes a second labyrinth seal 450 coupled to the backplate 404 via screws 452. The second labyrinth seal 450 is positioned around the shaft 420 aft of the shoulder 442 to help control the flow of fluid in the motor housing 406. In some examples, a pressure differential forward and aft of the second labyrinth seal 450 allows the fluid to flow past the second labyrinth seal 450 towards the aft end of the pump 400 where the fluid can be re-routed, as discussed below in association with FIGS. 9-10. In some examples, the second labyrinth seal 450 allows the fluid to through the motor housing 406 and into the compressor casing 402, as discussed below in association with FIG. 8.

In FIG. 4, the impeller 438 includes a body 454 and a nose 456 defined forward of the body 454. In FIG. 4, a forward end of the stem of the bolt 439 passes through the body 454 and the nose 456. Further, a cap or stopper 459 is coupled to the end of the stem proximate the nose 456 of the impeller 438. Accordingly, the bolt 439 interlocks a rotation of the impeller 438 with a rotation of the shaft 420.

The impeller 438 includes expeller vanes 460 (e.g., blades) that extend radially outward from the body 454. In FIG. 4, the forward end of the bolt 439 is positioned forward of expeller vanes 460. Further, the impeller 438 includes a shroud 458. In FIG. 4, an aft portion of the shroud 458 is fixed to ends of the expeller vanes 460 opposite the body 454. Accordingly, the shroud 458 and the body 454 define a passageway for the fluid.

During operations, as the shaft 420 rotates the impeller 438, the expeller vanes 460 compress and drive the fluid radially outward. In turn, at least a portion of the fluid can be driven through an outlet 462 of the pump 400 in connection with the thermal transport bus 202 of FIG. 3. In some examples, an aft side of the body 454 of the impeller 438 includes a second set of expeller vanes to drive fluid that flows between the backplate 404 and the aft side of the body 454 radially outwards, as discussed further in association with FIG. 8. In some other examples, the aft side of the body 454 of the impeller 438 does not include the second set of expeller vanes to enable the fluid to flow between the backplate 404 and the aft side of the body 454 such that the fluid can enter the motor housing 406, as discussed further in association with FIGS. 9-10.

Moreover, a forward portion of the shroud 458 extends forward of the expeller vanes 460 past the nose 456. Accordingly, the forward portion of the shroud 458 defines a perimeter within which the fluid flows in advance of being driven by the expeller vanes 460. Specifically, an inner surface of the forward portion of the shroud 458 is radially aligned with an inner surface of an inflow conduit 463 that defines a primary flow inlet 464 of the pump 400. Accordingly, when the fluid enters the pump 400 through the primary flow inlet 464, the expeller vanes 460 can drive at least a portion of the fluid through the outlet 462. In FIG. 4, the inflow conduit 463 is coupled to the compressor casing 402 via an interference fit. In some examples, the conduit 463 is formed by the compressor casing 402 (e.g., is integral with the compressor casing 402).

In FIG. 4, an impeller bearing 466 (e.g., a second radial bearing) supports the impeller 438 in the compressor casing 402. In FIG. 4, the impeller bearing 466 is a foil bearing. Additionally or alternatively, the impeller bearing 466 can include a hydrodynamic bearing, a rolling element bearing that includes a solid lubricant (e.g., silver coating, graphite, molybdenum disulfide, etc.), or any other bearing that can support the impeller 438 as the impeller 438 rotates. In FIG. 4, the impeller bearing 466 is positioned around the shroud 458 of the impeller 438. Specifically, the impeller bearing 466 is positioned around a portion of the expeller vanes 460 and extends forward of the nose 456 of the impeller 438. In some examples, the impeller bearing 466 is positioned aft of the nose 456. In some examples, the impeller bearing 466 is positioned around the nose 456 of the impeller 438, as discussed below in association with FIG. 5.

In FIG. 4, a fluid re-flow passageway is defined between the impeller bearing 466 and the shroud 458 of the impeller 438. Specifically, a portion of the fluid driven by the expeller vanes 460 can flow back between the shroud 458 and the impeller bearing 466. Accordingly, the fluid can cause the impeller bearing 466 to separate from, and avoid contact with, the shroud 458 in response to the impeller 438 rotating at a rate that satisfies (e.g., is greater than) a threshold rotational speed or angular velocity. In some examples, when the impeller bearing 466 is the hydrodynamic bearing and/or the rolling element bearing, the pump 400 does not include the fluid re-flow passageway.

In FIG. 4, the impeller bearing 466 can be coupled to a bearing cup 468 (e.g., a bearing sleeve) fixed within the compressor casing 402. For example, the impeller bearing 466 can be coupled to the bearing cup 468 via an interference fit (e.g., a press fit) or any other means for coupling that prevents at least a portion of the impeller bearing 466 from rotating in the bearing cup 468, such as a pin, a key, a spline, a machined flat, etc. Further, the bearing cup 468 can be fixed to the compressor casing 402 via an interference fit, screws, or any other means for coupling.

In FIG. 4, a third labyrinth seal 470 is coupled to a forward end of the bearing cup 468 via screws 469. The third labyrinth seal 470 is positioned around a forward portion of the shroud 458. Specifically, the impeller bearing 466 is positioned around a first portion (e.g., an aft portion) of the shroud 458 having a first outer diameter D8 and the third labyrinth seal 470 is positioned around a second portion (e.g., the forward portion) of the shroud 458 having a second outer diameter D9 smaller than the first outer diameter D8. In some examples, the first outer diameter D8 of the shroud 458 is approximately equivalent to the first outer diameter D1 of the shaft 420. In some examples, the shroud 458 includes a uniform outer diameter. Furthermore, an O-ring 471 can be positioned in a groove around an outer radial portion of the third labyrinth seal 470. Specifically, the O-ring 471 is positioned between the third labyrinth seal 470 and the conduit 463 (e.g., a body of the conduit 463). In some examples, the conduit 463 (e.g., the body of the conduit 463) helps maintain a position of the bearing cup 468 in the compressor casing 402.

The third labyrinth seal 470 helps control a flow of the fluid such that the fluid that flows through the inflow conduit 463 cannot flow between the third labyrinth seal 470 and the shroud 458. Moreover, the third labyrinth seal 470 enables the fluid that passes through the fluid re-flow passageway to flow around the forward end of the shroud 458 and mix with the fluid flowing through the inflow conduit 463. Accordingly, in response to flowing through the fluid re-flow passageway, the fluid can again be driven by the expeller vanes 460. In FIG. 4, a pocket 472 is defined between the impeller bearing 466 and the third labyrinth seal 470. The pocket 472 can help create a pressure differential that prevents fluid from flowing past the third labyrinth seal 470 toward the aft end of the pump 400.

As a result, the impeller bearing 466 can support the impeller 438 directly to increase a stability of the impeller 438 and the shaft 420. Further, the impeller bearing 466 enables a length of the shaft 420 to be reduced, which further reduces an amplitude of deflections that the shaft 420 may encounter from a force being imparted on the impeller 438. Additionally, reducing the length and, in turn, the weight of the shaft 420 reduces a power output that the motor 412 utilizes to drive the rotation of the shaft 420. In turn, the motor 412 can drive the shaft 420 and the impeller 438 with a greater angular velocity while reducing vibrations of the shaft 420 and the impeller 438. As such, the greater angular velocity of the impeller 438 enables the pump 400 to expel the fluid with an increased flow rate and/or pressure, which can increase a rate at which thermal energy is transferred to and/or from the fluid as the fluid flows through the heat exchanger(s) 206, 208 of FIG. 3. Accordingly, the improved thermal energy transfer that the pump 400 provides can enable certain components of the aircraft 10 of FIG. 1 and/or the gas turbine engine 100 of FIGS. 1 and/or 2 to operate within increased temperature ranges. Furthermore, because the impeller bearing 466 mounts the impeller 438 instead of the forward portion of the shaft 420, the impeller bearing 466 enables a size of the motor housing 406 and, thus, a size of the pump 400 to be reduced. Moreover, the size reduction enabled by the impeller bearing 466 can reduce a cost and/or a weight of the pump 400.

Figure 5:
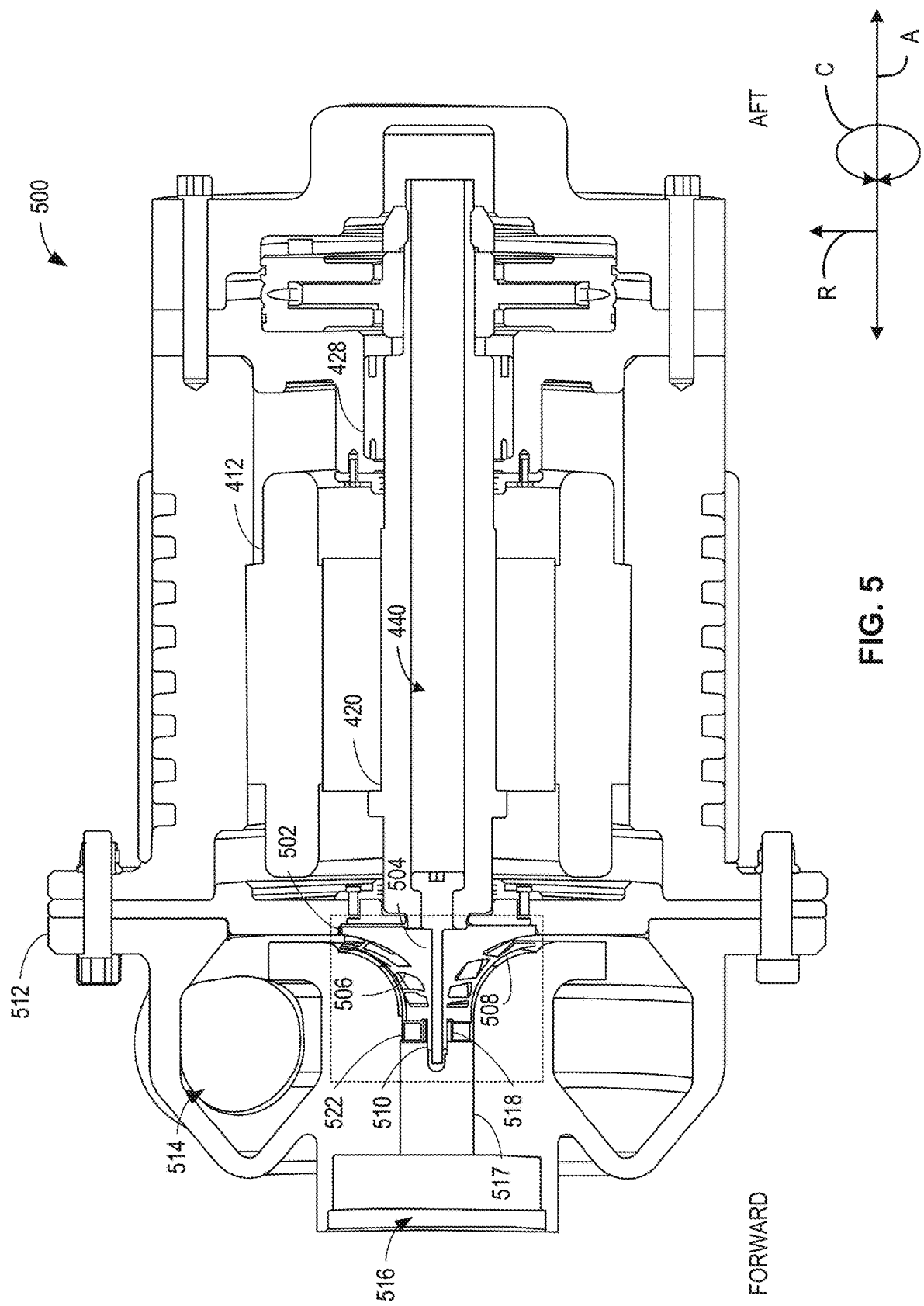
FIG. 5 illustrates another example thermal transport bus pump in accordance with the teachings disclosed herein.

FIG. 5 illustrates a second example straddle mounted fluid pump 500 in accordance with the teachings disclosed herein. Similarly, the second example pump 500 can be implemented in the example thermal management system 200 of FIG. 3 (e.g., as the pump 204 of FIG. 3) to drive a fluid (e.g., a heat exchange fluid such as a supercritical fluid (e.g., sCO$_2$)) through the thermal transport bus 202 of FIG. 3. Accordingly, the fluid can exchange thermal energy with a working fluid associated with the aircraft 10 of FIG. 1 and/or the gas turbine engine 100 of FIG. 2.

In FIG. 5, the second example fluid pump 500 includes a second example impeller 502 to compress the fluid in the pump 500. In FIG. 5, the impeller 502 includes a body 504, expeller vanes 506 extending from the body 504, a shroud 508 positioned around the expeller vanes 506, and a nose 510 defined forward of the expeller vanes 506. In FIG. 5, the motor 412 rotates the shaft 420, which causes the impeller 502 to rotate. Accordingly, the impeller 502 compresses fluid in an example compressor casing 512 of the pump 500. As a result, the impeller 502 drives the fluid through an outlet 514 of the compressor casing 512. Moreover, as the fluid exits the pump 500 through the outlet 514, fluid moves into the compressor casing 512 through an inlet 516 and flows through an inflow conduit 517 towards the impeller 502.

In FIG. 5, the example fluid pump 500 includes a second example impeller bearing 518 (e.g., a second radial bearing) to support the impeller 502. In FIG. 5, the impeller bearing 518 is a foil bearing. Additionally or alternatively, the impeller bearing 518 can include a hydrodynamic bearing a rolling element bearing that includes a solid lubricant and/or any other bearing that can support the impeller 502 as the impeller 502 rotates.

In FIG. 5, the impeller bearing 518 is positioned around the nose 510 of the impeller 502. Accordingly, the impeller bearing 518 is positioned forward of the expeller vanes 506. As a result, the fluid flowing through the inflow conduit 517 can flow between the impeller bearing 518 and the nose 510 of the impeller 502. Specifically, when a rotational speed of the impeller 502 satisfies (e.g., is greater than) a rotational speed threshold, the fluid can push an inner foil of the impeller bearing 518 away from the nose 510. In turn, the impeller 502 can rotate without contacting the impeller bearing 518, which minimizes or otherwise reduces a resistance against the rotation of the impeller 502. In some examples, when the impeller bearing 518 includes the rolling element bearing, the fluid may not flow between the impeller bearing 518 and the nose 510 of the impeller 502.

In FIG. 5, an outer diameter of the impeller bearing 518 is smaller than a diameter of the shaft 420 (e.g., the first outer diameter D1, the second outer diameter D2, the third outer diameter D3, the fourth outer diameter D4, and the fifth outer diameter D7 of FIG. 4). In some examples, an inner diameter of the impeller bearing 518 is smaller than a diameter of the bore 440 (e.g., the first inner diameter D5 and the second inner diameter D6 of the shaft 420). Accordingly, the impeller bearing 518 is positioned closer to a rotational axis of the impeller 502 and the shaft 420 than the first example impeller bearing 466 of FIG. 4 and the shaft radial bearing 428. As a result, the impeller bearing 518 can improve a stability of the impeller 502 at a reduced size. In turn, the impeller bearing 518 enables the pump 500 to have a reduced weight and a reduced length, which enables the pump 500 to be implemented in a variety of areas (e.g., of the aircraft 10, of the gas turbine engine 100, etc.)5.

Moreover, supporting an aft end of the shaft 420 with the shaft radial bearing 428 and the thrust bearing 430 and supporting a forward end of the impeller 502 with the impeller bearing 518 improves a stability of the shaft 420 and the impeller 502. In turn, the shaft 420 and the impeller 502 can be driven at higher rotational speeds with reduced deflections causing damage to the pump 400 and/or turbulence in the fluid that would otherwise result from vibrations of the impeller 502 and/or the shaft 420. Further, the impeller bearing 518 removes a need for a second radial bearing on the shaft 420, which enables a length and a weight of the shaft 420 to be reduced, which can also help reduce deflections encountered by the shaft 420 and/or the impeller 502. Accordingly, the increased stability provided by the impeller bearing 518 enables the motor 412 to drive the impeller 502 at higher rotational speeds such that the fluid can be expelled from the pump 500 with an increased pressure and/or flow rate. In turn, the pump 500 can enable thermal energy to be transferred between the fluid and a working fluid at a faster rate in the heat exchanger(s) 206, 208 of FIG. 3.

In FIG. 5, a stator vane housing 522 is positioned around the impeller bearing 518. For example, the impeller bearing 518 can be coupled to the stator vane housing 522 via an interference fit. In some examples, the stator vane housing 522 is formed integrally with the impeller bearing 518 (e.g., via additive manufacturing). Furthermore, the stator vane housing 522 is coupled to the compressor casing 512 via an interference fit. In some examples, the stator vane housing 522 is coupled to the compressor casing 512 via screws or any other means for coupling.

Figure 7:
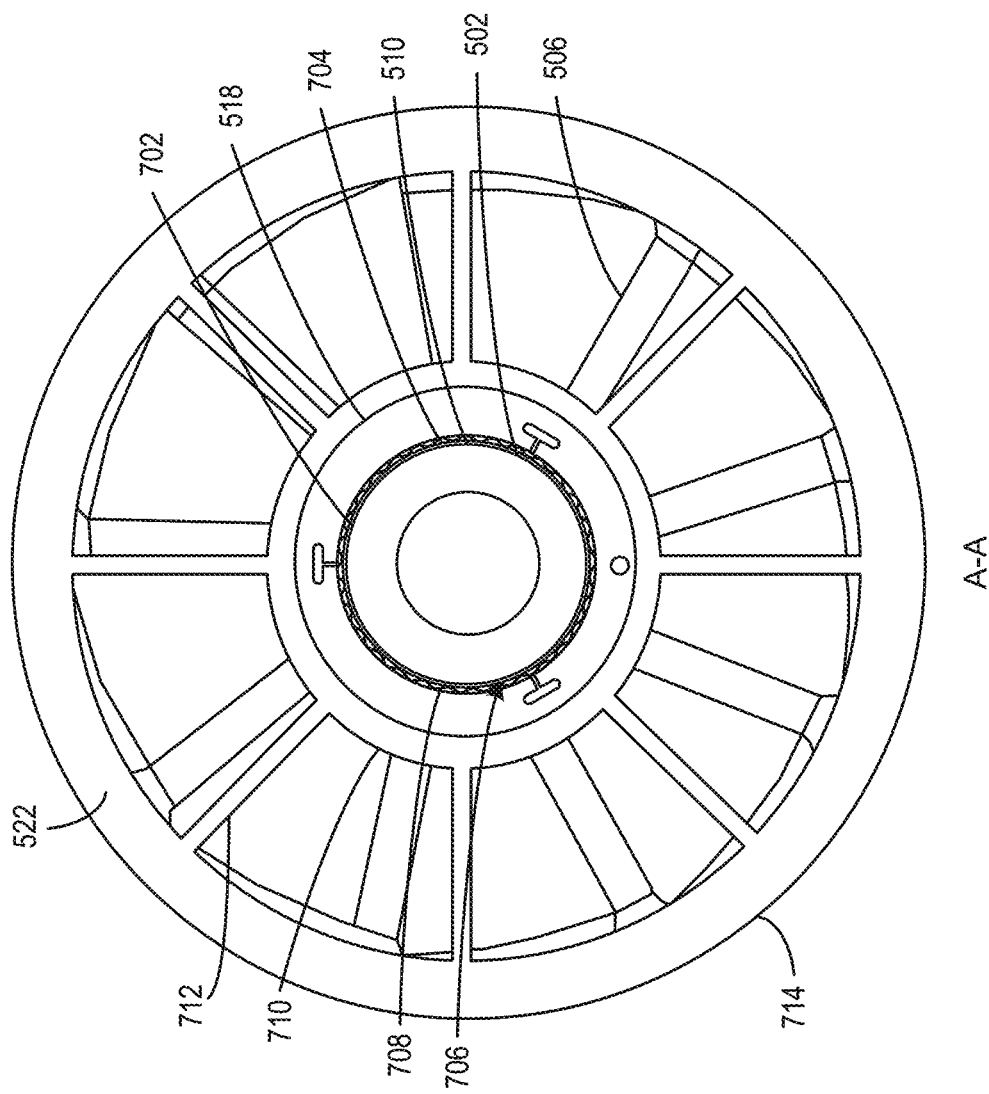
FIG. 7 illustrates a cross-section of the example impeller bearing of FIG. 6.

The stator vane housing 522 includes guide vanes that extend radially outward from the impeller bearing 518, as discussed further in association with FIG. 7. Specifically, the guide vanes can direct the fluid such that the fluid flows between the body 504 and the shroud 508 of the impeller 502. For example, a geometry of the guide vanes can cause the fluid to flow between the body 504 and the shroud 508 of the impeller such that the expeller vanes 506 encounter less resistance when driving the fluid. In some examples, the guide vanes of the stator vane housing 522 are formed with the compressor casing 512. In such examples, the guide vanes extend directly from an inner surface of the inflow conduit 517.

Figure 6:
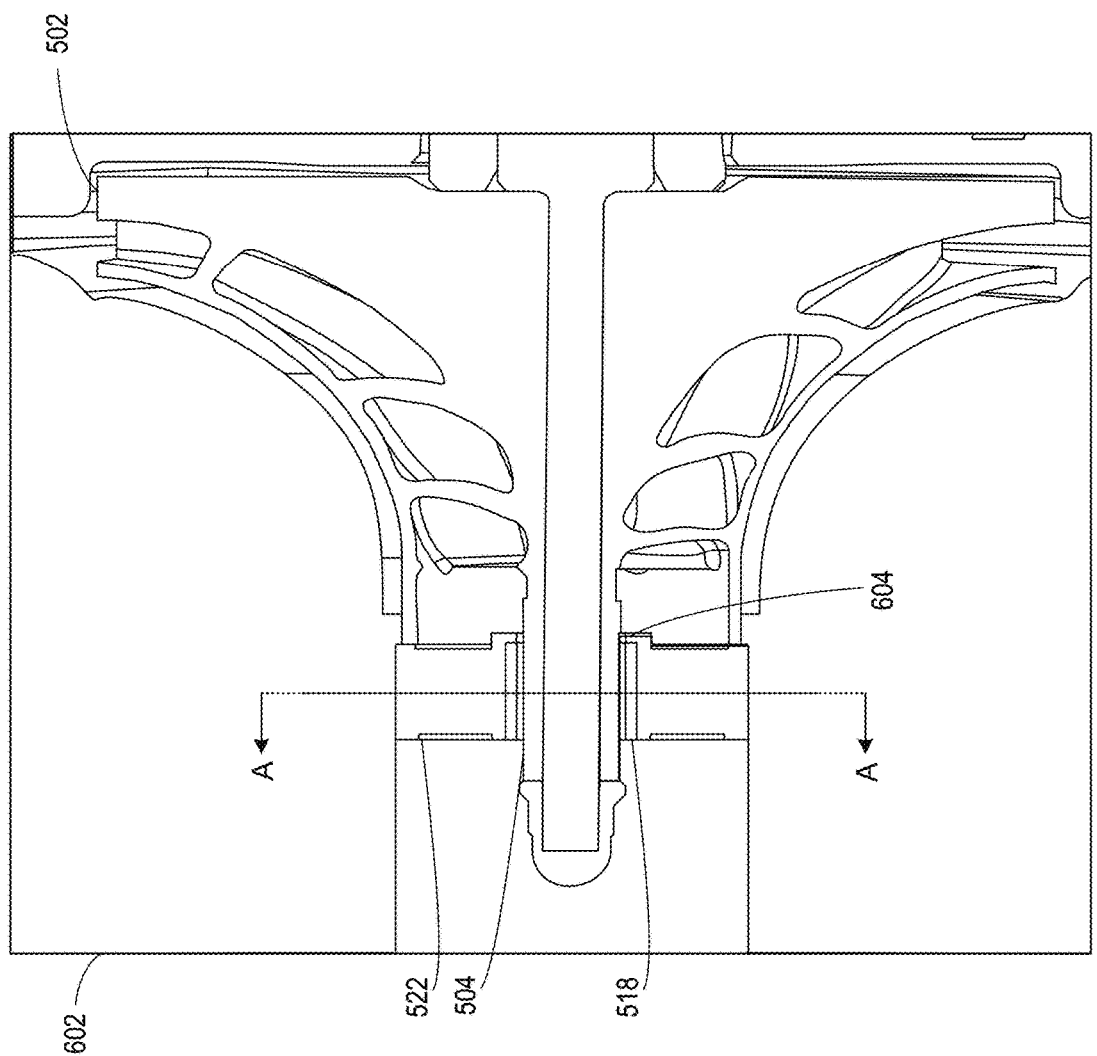
FIG. 6 illustrates a magnified view of an example impeller bearing of the thermal transport bus pump of FIG. 5.

FIG. 6 illustrates a magnified view of a portion 602 of the second example thermal transport bus pump 500 of FIG. 5. Specifically, FIG. 6 illustrates a magnified view of the impeller 502, the impeller bearing 518, and the stator vane housing 522 of FIG. 5. In FIG. 6, the stator vane housing 522 includes a ridge 604 that is positioned aft of the impeller bearing 518. Specifically, the ridge 604 wraps around an aft portion of the impeller bearing 518 to help prevent the impeller bearing 518 from becoming dislodged by the fluid flowing through the inflow conduit. Moreover, an inner diameter of the ridge 604 is greater than an inner diameter of the impeller bearing 518 such that the ridge 604 avoids contact with the nose 510 of the impeller 502.

FIG. 7 illustrates a cross-sectional view A-A of the impeller 502, the impeller bearing 518, and the stator vane housing 522 of FIGS. 5 and 6. Specifically, FIG. 7 illustrates the impeller bearing 518 and the stator vane housing 522 positioned around the nose 510 of the impeller 502.

In FIG. 7, the impeller 502 is rotating with an angular velocity that satisfies a threshold and, in turn, causes an outer radial surface 702 of the nose 510 to be separated from an inner radial surface 704 of the impeller bearing 518 by fluid flowing through a gap 706. Specifically, a rotation of the nose 510 creates a pressure that acts against the inner radial surface 704 of the impeller bearing 518. Further, the impeller bearing 518 includes a foil 708 that wraps around the inner radial surface 704.

During operations, the foil 708 compresses when the pressure acting against the inner radial surface 704 satisfies a pressure threshold, which causes the inner radial surface 704 to separate from the outer radial surface 702 of the nose 510. As a result, a first portion of the fluid flowing past the impeller bearing 518 in the inflow conduit 517 flows between the impeller bearing 518 and the nose 510 of the impeller 502 when the impeller 502 rotates faster than a certain rate. Accordingly, the fluid can lubricate the impeller bearing 518 such that the impeller bearing 518 can provide contactless support, which minimizes or otherwise reduces a resistance against the rotation of the impeller 502.

In FIG. 7, the stator vane housing 522 includes a base 710 coupled to the impeller bearing 518 and guide vanes 712 radially extending from the base 710. In some examples, the base 710 is integral with the impeller bearing 518. Further, the stator vane housing 522 includes a shroud 714 fixed to outer radial ends of the guide vanes 712. Accordingly, the shroud 714 is concentrically positioned around the base 710 and is coupled to the compressor casing 512.

During operations, a second portion of the fluid flowing past the impeller bearing 518 in the inflow conduit 517 flows between the guide vanes 712. As a result, the guide vanes 712 guide the fluid to the expeller vanes 506 positioned aft of the stator vane housing 522. Accordingly, the guide vanes 712 can increase a velocity of the fluid and, thus, enable the expeller vanes 506 to produce an increased output flow rate and/or pressure. Further, the impeller bearing 518 provides the expeller vanes 506 with an increased stability that enables the output flow rate and/or pressure to be further increased.

Figure 8:
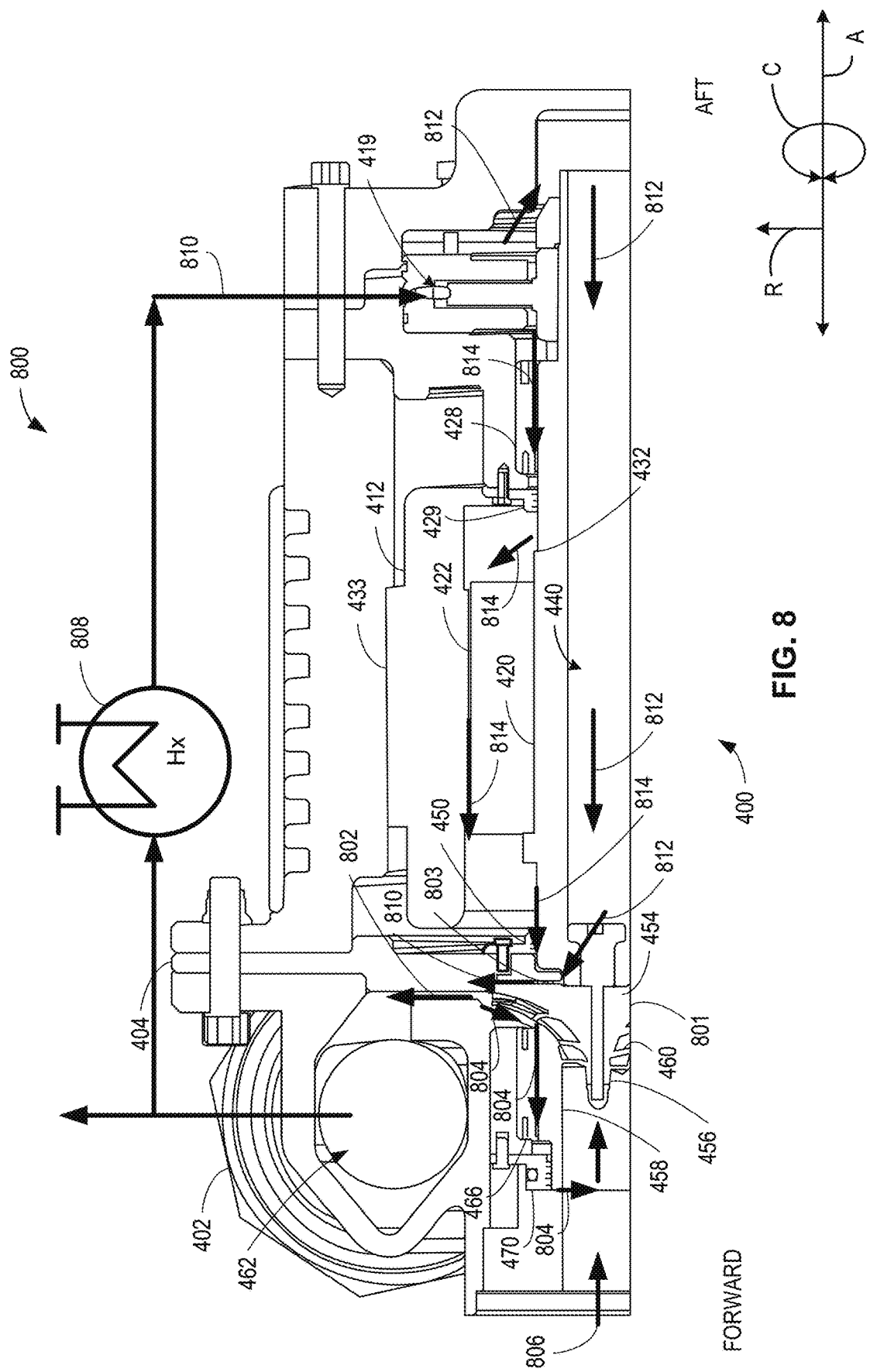
FIG. 8 illustrates an example fluid flow diagram associated with the thermal transport bus pumps of FIGS. 4 and/or 5.

FIG. 8 illustrates a first example fluid flow diagram 800 associated with the first example fluid pump 400 of FIG. 4. In FIG. 8, the first example fluid pump 400 includes a third example impeller 801. In addition to the body 454, the nose 456, the shroud 458, and the expeller vanes 460, the third example impeller 801 includes back expeller vanes 803 extending from an aft side of the body 454. Specifically, the back expeller vanes 803 extend between the aft side of the body 454 and the backplate 404.

During operations, the impeller 438 rotates and drives fluid radially outward between the compressor casing 402 and the backplate 404. A first portion of the fluid 802 is driven through the outlet 462. A second portion of the fluid 804 flows towards the forward end of the pump 400 between the impeller bearing 466 and the shroud 458 of the impeller 438. For example, the second portion of the fluid 804 can deflect off the compressor casing 402 and/or a pressure of the first portion of the fluid 802 can cause the second portion of the fluid 804 to flow towards the forward end of the pump 400. Further, the third labyrinth seal 470 enables the second portion of the fluid 804 to flow past a forward end of the shroud 458. In turn, the second portion of the fluid 804 can flow between the forward end of the shroud 458 and an aft end of the conduit 463 such that the second portion of the fluid 804 mixes with a primary input fluid 806. Accordingly, the second portion of the fluid 804 is again driven by the impeller 438 along with the primary input fluid 806. As such, the pump 400 maintains a recirculating flow that follows the second portion of the fluid and, in turn, provides lubrication for the impeller bearing 466.

In FIG. 8, the impeller bearing 466 is a foil bearing. In some examples, when the impeller bearing 466 is a hydrodynamic bearing and/or a rolling element bearing, the impeller bearing 466 does not leave space for the second portion of the fluid 804 to separate from the first portion of the fluid 802, and, in turn, the second portion of the fluid 804 is driven through the outlet 462 along with the first portion of the fluid 802.

In FIG. 8, in response to being driven through the outlet 462, the first portion of the fluid 802 can flow through one or more heat exchangers 808 (e.g., the heat source heat exchanger(s) 206 of FIG. 3, the heat sink heat exchanger(s) 208 of FIG. 3, etc.). In some examples, the first portion of the fluid 802 bypasses the heat exchanger(s) 808. Further, at least a portion of the first portion of the fluid 802 can form a secondary input fluid 810 that re-enters the pump 400 through the secondary flow inlet 419. Accordingly, the secondary input fluid 810 flows between the thrust disc 434 and the foil bearing 436. A first portion 812 of the secondary input fluid 810 flows towards the aft end of the pump 400. Further, a pressure in the pump 400 can cause the first portion 812 of the secondary input fluid 810 to flow through the bore 440 in the shaft 420 towards the forward end of the pump 400. Further, a forward portion of the shaft 420 can include a conduit that carries the first portion 812 of the secondary input fluid 810 out of the motor housing 406 between the impeller 438 and the backplate 404.

In FIG. 8 a second portion 814 of the secondary input fluid 810 flows towards the forward end of the pump in response to entering the motor housing 406 through the secondary flow inlet 419. As such, the second portion 814 of the secondary input fluid 810 flows between the shaft radial bearing 428 and the shaft 420. Furthermore, the first labyrinth seal 429 enables the second portion 814 of the secondary input fluid 810 to pass through and flow towards the forward end of the pump 400. In turn, the second portion 814 of the secondary input fluid 810 can flow between the rotor 422 and the stator 433 of the motor 412. In some examples, the ridge 432 of the shaft 420 can help deflect the second portion 814 of the secondary input fluid 810 away from the shaft 420 and towards the passageway between the rotor 422 and the stator 433. Moreover, the second labyrinth seal 450 enables the second portion 814 of the secondary input fluid 810 to past toward the forward end of the pump 400.

As such, the second portion 814 of the secondary input fluid 810 can mix with the first portion of the fluid 802 between the backplate 404 at the aft side of the impeller 438. In turn, the back expeller vanes 803 can drive the secondary input fluid 810 radially outward between the impeller 438 and the backplate 404. Accordingly, the secondary input fluid 810 can mix with the first portion of the fluid 802 being driven through the outlet 462.

While FIG. 8 is described in the context of the first example fluid pump 400, it should be understood that aspects of the first example fluid flow diagram 800 are also associated with the second example fluid pump 500 of FIG. 5. In particular, in the second example fluid pump 500, the second portion of the fluid 804 remains with the first portion of the fluid 802 as opposed to flowing back towards the forward end of the pump 400 between the impeller bearing 466 and the shroud 458. Additionally, in the second example fluid pump 500, a first portion of the primary input fluid 806 flows towards the impeller 502 of FIGS. 5-7 between the impeller bearing 518 of FIGS. 5-7 and the nose 510 of FIGS. 5-7 while a second portion of the primary input fluid 806 flows towards the impeller 502 between the guide vanes 712 of FIG. 7.

Figure 9:
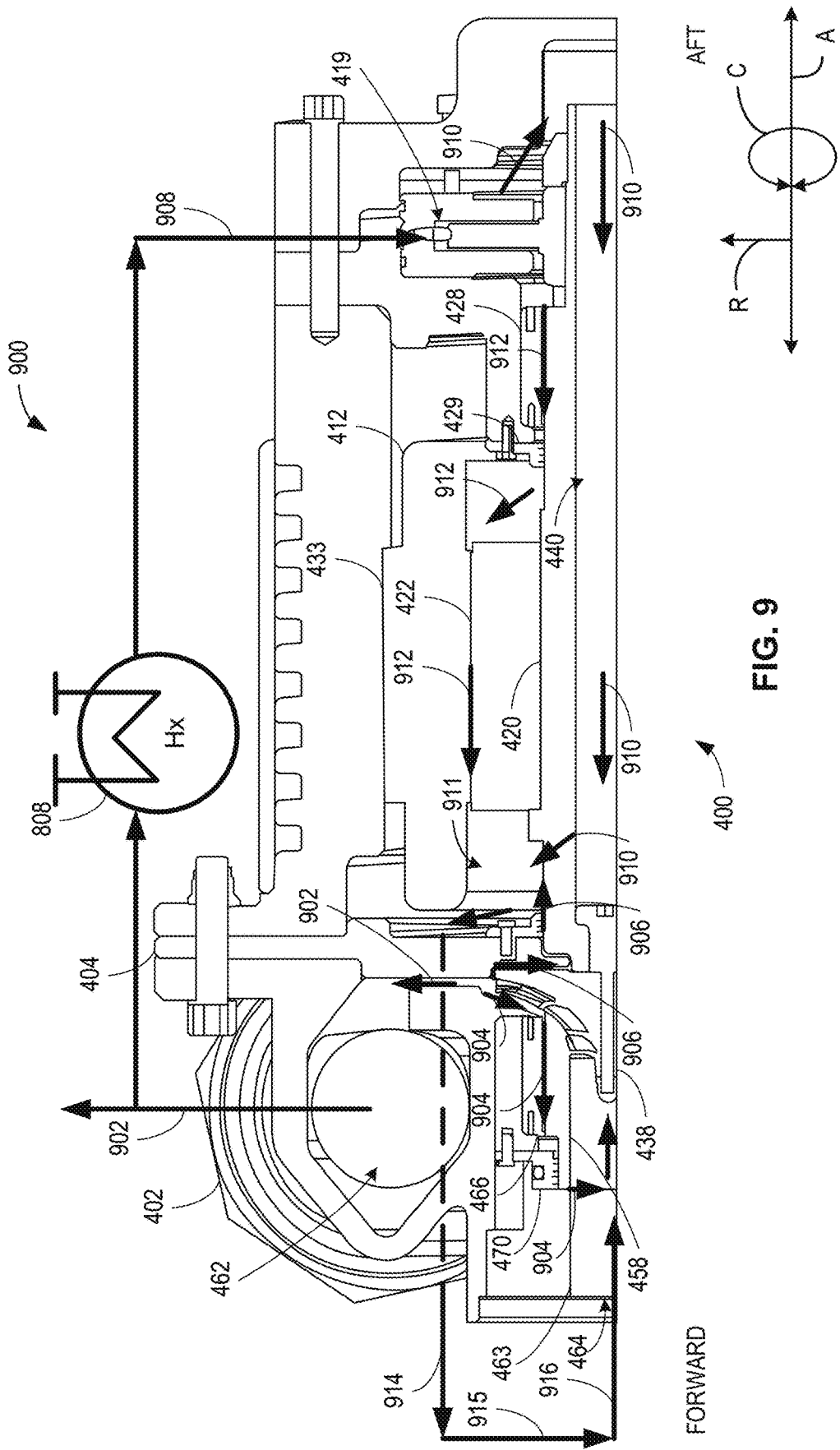
FIG. 9 illustrates another example fluid flow diagram associated with the thermal transport bus pumps of FIGS. 4 and/or 5.

FIG. 9 illustrates a second example fluid flow diagram 900 associated with the first example fluid pump 400 of FIG. 4. In FIG. 9, the impeller 438 drives fluid radially outward between the compressor casing 402 and the backplate 404. In FIG. 9, a first portion of the fluid 902 is driven through the outlet 462. Similar to the first fluid flow diagram 800 of FIG. 8, a second portion of the fluid 904 is driven towards a forward end of the pump 400 and provides lubrication between the shroud 458 of the impeller 438 and the impeller bearing 466.

In FIG. 9, the impeller bearing 466 is a foil bearing. In some examples, when the impeller bearing 466 is a hydrodynamic bearing and/or a rolling element bearing, the impeller bearing 466 does not leave space for the second portion of the fluid 904 to separate from the first portion of the fluid 902, and, in turn, the second portion of the fluid 904 is driven through the outlet 462 along with the first portion of the fluid 902.

Further, a third portion of the fluid 906 is driven towards an aft end of the pump 400 and flows between the impeller 438 and the backplate 404. For example, a pressure in the pump 400 can cause the third portion of the fluid 906 to flow between the impeller 438 and the backplate 404. In FIG. 9, the second labyrinth seal 450 enables the third portion of the fluid 906 to flow into the motor housing 406.

Similar to the first example fluid flow diagram 800, the first portion of the fluid 902 can flow through the one or more heat exchanger(s) 808 or bypass the heat exchanger(s) 808. In turn, the first portion of the fluid 902 can form a secondary input fluid 908 that re-enters the pump 400 through the secondary flow inlet 419.

In FIG. 9, a first portion 910 of the secondary input fluid 908 can flow through the bore 440 in the shaft 420. In FIG. 9, the first portion 910 of the secondary input fluid 908 exits the bore 440 forward of the rotor 422. For example, the shaft 420 can include a conduit that fluidly the bore 440 with a chamber 911 in the motor housing 406 forward of the rotor 422. In turn, the first portion 910 of the secondary input fluid 908 mixes with the third portion of the fluid 906 in the motor housing 406 forward of the rotor 422.

Further, a second portion 912 of the secondary input fluid 908 can flow between the shaft 420 and the shaft radial bearing 428. In turn, the first labyrinth seal 429 enables the second portion 912 of the secondary input fluid 908 to flow towards the forward end of the pump 400. Further, the second portion 912 of the secondary input fluid 908 flows between the rotor 422 and the stator 433 of the motor 412 and mixes with the first portion 910 of the secondary input fluid 908 and the third portion of the fluid 906 in the chamber 911.

In FIG. 9, a recirculating passageway 914 is fluidly coupled to the motor housing 406. Further, the recirculating passageway 914 is fluidly coupled to a flow path 915 that injects the fluid into the pump 400 through the inlet 464. As such, the third portion of the fluid 906 driven by the impeller 438 and the secondary input fluid 908 flows through the recirculating passageway 914 and mixes with an input fluid 916. Accordingly, the third portion of the fluid 906, the secondary input fluid 908, and the input fluid 916 flow through the conduit 463. As such, the third portion of the fluid 906, the secondary input fluid 908, and the input fluid 916 mix with the second portion of the fluid 904. Further, the third portion of the fluid 906, the secondary input fluid 908, the input fluid 916, and the second portion of the fluid 904 are driven by the impeller 438.

While FIG. 9 is described in the context of the first example fluid pump 400, it should be understood that aspects of the second example fluid flow diagram 900 are also associated with the second example fluid pump 500 of FIG. 5. In particular, in the second example fluid pump 500, the second portion of the fluid 904 remains with the first portion of the fluid 902 as opposed to flowing back towards the forward end of the pump 400 between the impeller bearing 466 and the shroud 458. Additionally, in the second example fluid pump 500, a first portion of the fluid flowing towards the impeller 502 of FIGS. 5-7 flows between the impeller bearing 518 of FIGS. 5-7 and the nose 510 of FIGS. 5-7 while a second portion of the fluid flowing towards the impeller 502 flows between the guide vanes 712 of FIG. 7.

Figure 10:
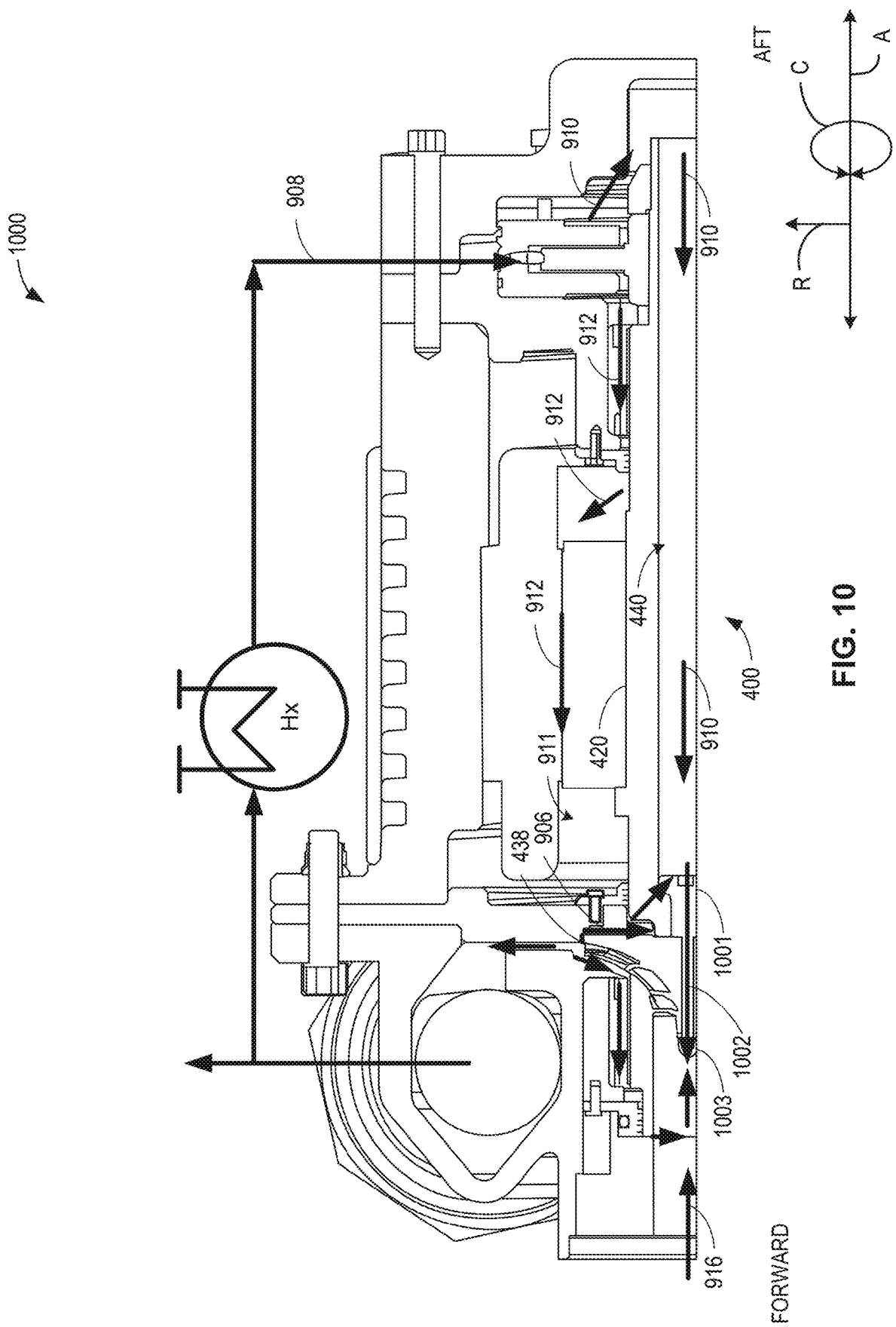
FIG. 10 illustrates another example fluid flow diagram associated with the thermal transport bus pumps of FIGS. 4 and/or 5.

FIG. 10 illustrates a third example fluid flow diagram 1000 associated with the first example fluid pump 400 of FIG. 4. In FIG. 10, instead of the recirculating passageway 914 of FIG. 9, the fluid pump 400 includes a bolt 1001 (e.g., the bolt 439) that couples that impeller 438 to the shaft 420. In particular, the bolt 1001 has a bore extending axially therethrough. Further, the bore extends through a stopper 1003 (e.g., the stopper 459) proximate the nose 456 of the impeller 438. Accordingly, the bore defines a flow through path 1002 in the bolt 1001 that enables fluid in the bore 440 of the shaft 420 to mix with the input fluid 916.

In FIG. 10, the shaft 420 includes a conduit through which the third portion of the fluid 906 can flow into the bore 440 in response to flowing around the aft side of the impeller 438. Further, the second portion 912 of the secondary input fluid 908 can flow into the bore 440 through the same conduit as the third portion of the fluid 906. In some examples, the shaft 420 includes a second conduit aft of the second labyrinth seal 450 that fluidly couples the bore 440 and the chamber 911. In such examples, the second portion 912 of the secondary input fluid 908 can enter the bore 440 through the second conduit in the shaft 420.

Accordingly, the third portion of the fluid 906, the first portion 910 of the secondary input fluid 908, and the second portion 912 of the secondary input fluid 908 mix in the bore 440. In turn, the third portion of the fluid 906, the first portion 910 of the secondary input fluid 908 can pass through the flow through path 1002 and mix with the input fluid 916 that flows through the conduit 463. As a result, the input fluid 916 pushes the third portion of the fluid 906 and the secondary input fluid 908 back towards the impeller 438.

While FIG. 10 is described in the context of the first example fluid pump 400, it should be understood that aspects of the third example fluid flow diagram 1000 are also associated with the second example fluid pump 500 of FIG. 5.

In some examples, the first fluid pump 400 (FIGS. 4, and 8-10) and the second fluid pump 500 (FIGS. 5-7) include means for pumping fluid. For example, the means for pumping may be implemented by the impeller 438 of FIGS. 4, 9, and 10, the impeller 502 of FIGS. 2-4, and/or the impeller 801 of FIG. 5.

In some examples, the first fluid pump 400 (FIGS. 4, and 8-10) and the second fluid pump 500 (FIGS. 5-7) include means for positioning the means for pumping fluid. For example, the means for positioning may be implemented by the shaft 420 of FIGS. 4-10.

In some examples, the first fluid pump 400 (FIGS. 4, and 8-10) and the second fluid pump 500 (FIGS. 5-7) include means for driving a rotation of the means for pumping fluid. For example, the means for driving may be implemented by the motor 412 of FIGS. 4-10.

In some examples, the first fluid pump 400 (FIGS. 4, and 8-10) and the second fluid pump 500 (FIGS. 5-7) include means for supporting the means for pumping fluid. For example, the means for supporting may be implemented by the impeller bearing 466 of FIGS. 4, and 8-10, and/or the impeller bearing 518 of FIGS. 5-7.

In some examples, the first fluid pump 400 (FIGS. 4, and 8-10) and the second fluid pump 500 (FIGS. 5-7) include means for guiding fluid towards the means for pumping fluid. For example, the means for guiding may be implemented by the stator vane housing 522 of FIGS. 5-7. Accordingly, the means for guiding can be positioned around the means for supporting.

From the foregoing, it will be appreciated that example pumps and/or pump systems have been disclosed that provide radial support directly to an impeller with an impeller bearing. As a result, the impeller bearing improves a stability of the impeller and an associated shaft that rotates the impeller. In turn, the impeller bearing enables the impeller to operate at higher rotational speeds without encountering deflections that would otherwise damage the pump and/or impact a fluid output pressure and/or flow rate of the pump. Accordingly, the impeller bearing enables the pump to produce increased output pressures and/or flow rates. Moreover, the impeller bearing enables the associated shaft to be radially supported by a single radial bearing. In turn, a length of the shaft and, in turn, a length of an associated housing can be minimized or otherwise reduced. As such, the impeller bearing can enable a size, a weight, and/or a cost of the pump to be reduced.

The foregoing examples of the pumps can be used with thermal transport systems. Although each example pump or pump system disclosed above has certain features, it should be understood that it is not necessary for a particular feature of one example pump or pump system to be used exclusively with that example. Instead, any of the features described above and/or depicted in the drawings can be combined with any of the examples, in addition to or in substitution for any of the other features of the examples. Features of one example are not mutually exclusive to features of another example. Instead, the scope of this disclosure encompasses any combination of any of the features.

Example impeller bearings for pumps are disclosed herein. Further examples and combinations thereof include the following:

Example 1 includes a fluid pump comprising a motor, a shaft coupled to a rotor of the motor, an impeller coupled to an end of the shaft, a first radial bearing positioned around the shaft of the motor aft of the motor, and a second radial bearing positioned around the impeller.

Example 2 includes the fluid pump of any preceding clause, wherein the first radial bearing and the second radial bearing are at least one of foil bearings, hydrodynamic bearings, or rolling element bearings.

Example 3 includes the fluid pump of any preceding clause, wherein the second radial bearing is positioned around a nose of the impeller.

Example 4 includes the fluid pump of any preceding clause, further including stator vanes extending radially from the second radial bearing.

Example 5 includes the fluid pump of any preceding clause, wherein an input fluid flows between the second radial bearing and the nose of the impeller.

Example 6 includes the fluid pump of any preceding clause, wherein the second radial bearing is positioned around a body of the impeller.

Example 7 includes the fluid pump of any preceding clause, wherein a portion of a fluid output driven by the impeller flows between the body of the impeller and the second radial bearing.

Example 8 includes the fluid pump of any preceding clause, wherein the fluid output flows toward blades of the impeller in response to flowing between the body of the impeller and the second radial bearing.

Example 9 includes the fluid pump of any preceding clause, wherein at least a portion of the second radial bearing is positioned forward of blades of the impeller.

Example 10 includes the fluid pump of any preceding clause, further including a bolt to rotatably couple the shaft of the motor to the impeller, a first end of the bolt positioned in a cavity defined by the shaft, a second end of the bolt positioned forward of blades of the impeller.

Example 11 includes the fluid pump of any preceding clause, wherein the impeller is coupled to an end of the shaft forward of the motor, further including a thrust bearing for the shaft positioned aft of the first radial bearing.

Example 12 includes the fluid pump of any preceding clause, wherein a primary flow inlet is defined forward of the second radial bearing and a secondary flow inlet is defined aft of the first radial bearing.

Example 13 includes a fluid pump comprising an impeller engaged with a shaft, and an impeller bearing radially positioned around a portion of the impeller, at least a portion of the impeller bearing positioned forward of blades of the impeller.

Example 14 includes the fluid pump of any preceding clause, further including a bolt to rotatably couple the impeller to the shaft, the bolt to extend past the blades of the impeller.

Example 15 includes the fluid pump of any preceding clause, wherein the portion of the impeller bearing is a first portion, wherein at least a second portion of the impeller bearing is positioned around the bolt.

Example 16 includes the fluid pump of any preceding clause, further including a motor to drive a rotation of the shaft, wherein the motor is separated from the impeller by a first distance, a shaft radial bearing positioned around the shaft, wherein the shaft radial bearing is separated from the impeller by a second distance greater than the first distance, and a thrust bearing positioned around the shaft, wherein the thrust bearing is separated from the impeller by a third distance greater than the second distance.

Example 17 includes the fluid pump of any preceding clause, wherein the impeller includes a nose and blades, the nose defined forward of the blades, the impeller radial bearing positioned around the nose of the impeller, further including a stator vane housing positioned around the impeller radial bearing.

Example 18 includes a fluid pump comprising means for pumping fluid, means for positioning the means for pumping fluid, means for driving a rotation of the means for positioning, and means for supporting the means for pumping fluid.

Example 19 includes the fluid pump of any preceding clause, wherein the means for pumping fluid is to pump the fluid between the means for supporting and the means for pumping fluid.

Example 20 includes the fluid pump of any preceding clause, wherein an intake of the fluid pump flows between the means for pumping fluid and the means for supporting.

Example 21 includes the fluid pump of any preceding clause, further including means for guiding the fluid towards the means for pumping fluid, the means for guiding positioned around the means for supporting.

Example 22 includes the fluid pump of any preceding clause, wherein the impeller is coupled to a first end of the shaft, wherein the shaft includes a bore defining an opening in a second end of the shaft.

Example 23 includes the fluid pump of any preceding clause, wherein at least a portion of a fluid that flows through the secondary flow inlet flows through the bore.

Example 24 includes the fluid pump of any preceding clause, further including a labyrinth seal positioned around the impeller.

Example 25 includes the fluid pump of any preceding clause, wherein the first radial bearing and the second radial bearing straddle mount opposite ends of the shaft and the impeller.

Example 26 includes an aircraft engine comprising an outer casing, a compressor section, a combustor section, a turbine section, and a fluid pump including an impeller to drive a fluid at least partially around or through at least one of the outer casing, the compressor section, the combustor section, or the turbine section, and an impeller bearing positioned around the impeller.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A fluid pump comprising:
a motor;
a shaft coupled to the motor;
an impeller coupled to the shaft forward of the motor, the impeller including blades to pump a fluid;
a first radial bearing positioned around the shaft aft of the motor;
a second radial bearing positioned around the impeller forward of the blades of the impeller or a portion of the shaft forward of the blades of the impeller; and
a stator vane housing including guide vanes, wherein the stator vane housing includes a base in contact with the second radial bearing, wherein the stator vane housing includes a shroud concentrically positioned around the base, wherein the stator vane housing is coupled to a casing of the fluid pump, wherein the guide vanes extend radially from the base to the shroud upstream of the blades of the impeller, wherein the guide vanes define a first flow path for a first portion of the fluid between the guide vanes at an axial position defined by the fluid pump, and wherein the second radial bearing defines a second flow path for a second portion of the fluid through the second radial bearing at the axial position.

2. The fluid pump of claim 1, wherein the first radial bearing and the second radial bearing are at least one of foil bearings, hydrodynamic bearings, or rolling element bearings.

3. The fluid pump of claim 1, wherein the first portion and the second portion of the fluid contact the blades of the impeller after flowing between the guide vanes and through the second radial bearing.

4. The fluid pump of claim 1, wherein the second radial bearing is positioned around a nose of the impeller.

5. The fluid pump of claim 1, wherein the shaft includes a bore through which the fluid flows.

6. The fluid pump of claim 5, wherein a first diameter of the second radial bearing is smaller than a second diameter of the bore.

7. The fluid pump of claim 1, further including a ridge extending from the base to prevent the second radial bearing from becoming dislodged.

8. The fluid pump of claim 7, wherein the ridge is positioned aft of the second radial bearing.

9. The fluid pump of claim 8, wherein a first inner diameter of the ridge is greater than a second inner diameter of the impeller.

10. The fluid pump of claim 1, wherein a first diameter of the first radial bearing is greater than a second diameter of the second radial bearing.

11. A fluid pump comprising:
a motor;
a shaft coupled to the motor;
an impeller coupled to the shaft forward of the motor, the impeller including blades to pump a fluid;
a radial bearing positioned around the impeller forward of the blades of the impeller or a portion of the shaft forward of the blades of the impeller, wherein the fluid pump defines a flow path for the fluid in which a first portion of the fluid flows in an axial direction at a first radial location that is radially inward of at least a portion of the radial bearing and a second portion of the fluid flows in the axial direction at a second radial location that is radially outward of the radial bearing in a same axial location defined by the fluid pump as the first portion of the fluid; and
a stator vane housing including guide vanes, wherein the stator vane housing includes a base in contact with the second radial bearing, wherein the stator vane housing includes a shroud concentrically positioned around the base, wherein the stator vane housing is coupled to a casing of the fluid pump, wherein the guide vanes extend radially from the base to the shroud upstream of the blades of the impeller, wherein the guide vanes direct the second portion of the fluid.

12. The fluid pump of claim 11, further including a ridge extending from the base and positioned aft of the portion of the radial bearing.

13. The fluid pump of claim 12, wherein a first inner diameter of the ridge is greater than a second inner diameter of the impeller.

14. The fluid pump of claim 11, wherein the radial bearing is a first radial bearing, wherein the first radial bearing and the shaft are positioned forward of the motor, further including a second radial bearing positioned around the shaft aft of the motor.

15. The fluid pump of claim 14, wherein a first inner diameter of the first radial bearing is less than a second inner diameter of the second radial bearing.

16. A fluid pump comprising:
   a motor;
   a shaft coupled to a rotor of the motor;
   an impeller coupled to the shaft forward of the motor, the impeller including blades to pump a fluid;
   a radial bearing positioned around the impeller forward of the blades of the impeller or a portion of the shaft forward of the blades of the impeller; and
   a stator vane housing including guide vanes, wherein the stator vane housing includes a base in contact with an outer radial surface of the radial bearing, wherein the stator vane housing includes a shroud concentrically positioned around the base, wherein the stator vane housing is coupled to a casing of the fluid pump, wherein the guide vanes extend from the base to the shroud upstream of the blades of the impeller in a same axial location defined by the fluid pump as the radial bearing, wherein the guide vanes define a first flow path for a first portion of the fluid between the guide vanes at an axial position defined by the fluid pump, and wherein the radial bearing defines a second flow path for a second portion of the fluid through the radial bearing at the axial position.

17. The fluid pump of claim 16, wherein the first portion and the second portion of the fluid contact the blades of the impeller after flowing between the guide vanes and through the radial bearing.

* * * * *